(12) United States Patent
Rourke et al.

(10) Patent No.: US 9,208,158 B2
(45) Date of Patent: Dec. 8, 2015

(54) SYSTEM AND METHOD FOR CONTENT SYNDICATION SERVICE

(75) Inventors: Steven Michael Rourke, Bartlett, IL (US); Erich Michael Specht, Palatine, IL (US)

(73) Assignee: CFE MEDIA LLC, Oak Brook, IL (US)

( * ) Notice: Subject to any disclaimer, the term of this patent is extended or adjusted under 35 U.S.C. 154(b) by 268 days.

(21) Appl. No.: 13/219,105

(22) Filed: Aug. 26, 2011

(65) Prior Publication Data

US 2013/0054688 A1 Feb. 28, 2013

(51) Int. Cl.
*G06F 15/16* (2006.01)
*G06F 17/30* (2006.01)

(52) U.S. Cl.
CPC ...... *G06F 17/30038* (2013.01); *G06F 17/3089* (2013.01)

(58) Field of Classification Search
None
See application file for complete search history.

(56) References Cited

U.S. PATENT DOCUMENTS

| | | | | |
|---|---|---|---|---|
| 2004/0045021 | A1* | 3/2004 | Weinblatt et al. | 725/20 |
| 2005/0246193 | A1* | 11/2005 | Roever et al. | 705/1 |
| 2007/0055748 | A1* | 3/2007 | Kim | G06F 17/30896 709/219 |
| 2007/0121651 | A1* | 5/2007 | Casey et al. | 370/401 |
| 2007/0198701 | A1* | 8/2007 | Pindra et al. | 709/224 |
| 2010/0153360 | A1* | 6/2010 | Waldo et al. | 707/710 |
| 2011/0072073 | A1* | 3/2011 | Curtis | 709/203 |

OTHER PUBLICATIONS

Box et al., Simple Object Access Protocol (SOAP) 1.1, May 8, 2000. W3C. All Pages.*

* cited by examiner

*Primary Examiner* — Mohamed Wasel
*Assistant Examiner* — Tsung Wu
(74) *Attorney, Agent, or Firm* — Seth H. Ostrow, Esq.; Meister Seelig & Fein LLP

(57) ABSTRACT

A method for providing content syndication to subscribers including receiving one or more content items from a plurality of information sources. One or more tags are assigned to the one or more content items, the one or more tags indicating a taxonomy of the one or more content items. One or more keywords associated with the one or more content items and a media type of the one or more content items are identified. The one or more content items are indexed with the one or more tags, the one or more keywords, and the media type. The method further includes retrieving the one or more content items based on the one or more tags, the one or more keywords, and the media type.

39 Claims, 16 Drawing Sheets

SYSTEM AND METHOD FOR CONTENT SYNDICATION SERVICE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to the field of content syndication.

BACKGROUND OF THE INVENTION

Publishers produce content such as print, magazines, articles and newspapers. However since the age of the "dot-com" era, focus has shifted from print to electronic publishing and websites. Electronic publishing has become common in scientific publishing where peer-reviewed scientific journals are in the process of being replaced by electronic publishing. There is statistical evidence that electronic publishing provides greater dissemination over print. A number of journals have, while retaining their peer review process, established electronic versions or even moved entirely to electronic publication. While the term "electronic publishing" is primarily used today to refer to the current offerings of online and web-based publishers, the term has a history of being used to describe the development of new forms of production, distribution, and user interaction in regard to computer-based production of text and other interactive media.

Often times, companies who own websites may offer external electronic publishing content to support their website and products. These websites may sell products and provide additional information related to their products. For example, a company selling wireless devices may want to provide independent product testing, reviews, studies, videos, and articles relating to wireless technology. Larger corporations have the resources and manpower to regularly maintain and update the content of their websites, which is often done manually. However, smaller companies often fail to regularly maintain the content of their websites due to the lack of time and resources. As a result, the supporting content on the website of the smaller companies become stale rather quickly. In some industries, content may become stale in a matter of days. Given the circumstances, smaller companies may not be able to attract as many customers as the larger corporations because of their poorly maintained websites. Some visitors may even assume that the smaller companies no longer exist due to their outdated content.

There is thus a need to provide regularly updated content to websites without requiring a large amount of resources and manpower.

SUMMARY OF THE INVENTION

The present invention provides a method and system for providing content syndication to subscribers. The method includes receiving one or more content items from a plurality of information sources. One or more tags are assigned to the one or more content items, the one or more tags indicating a taxonomy of the one or more content items. One or more keywords associated with the one or more content items and a media type of the one or more content items are identified. The one or more content items are indexed with the one or more tags, the one or more keywords, and the media type. The method further includes retrieving the one or more content items based on the one or more tags, the one or more keywords, and the media type.

According to another embodiment, the method comprises receiving a request for one or more desired content items from a corpus and generating a feed definition for the one or more desired content items. A selection of one or more taxonomies, one or more keywords and a selection of a media type for the one or more desired content items are received. The one or more desired content items are characterized on the basis of the one or more taxonomies, the one or more keywords, and the media type. The characterization of the one or more desired content items are associated with the feed definition. The method further includes storing the feed definition to retrieve content from the corpus matching the feed definition. The one or more taxonomies may include at least one of a topic, target, type, origin, and purpose and the media type is at least one of an article and a digital asset. The method may also comprise receiving a recency criterion for the one or more desired content items.

In certain embodiments, the method comprises identifying one or more content items matching a feed definition, the feed definition specifying a desired type of content according to one or more taxonomies, one or more keywords, a media type, a recency criterion, and a specified delivery method. A queue is populated with a list of the identified one or more content items. The method further includes retrieving the one or more identified content items on the list from the queue based on the media type of the feed definition and delivering the one or more content items based on the specified delivery method of the feed definition.

The one or more content items may be delivered using a SOAP transmission in response to a retrieval request. The method may further comprise embedding a tracking object within the one or more identified content items. According to some embodiments, the method may comprise receiving information from the tracking object when the one or more identified content items are viewed and generating a report with the received information. A subscription fee may be determined based on the received information.

In some embodiments, the method may further comprise associating subscribers to the feed definition. Delivering the one or more content items may comprise delivering the one or more content items to a subscriber of the feed definition. Delivering the one or more content items comprises may also comprise generating one or more files including the one or more identified content items on the list and delivering the one or more files. Generating the one or more files may include determining the media type of the feed definition and extracting the one or more identified content items into the one or more files. Extracting the one or more identified content items may comprise extracting one or more links or one or more images into the one or more files. According to some embodiments, the method may comprise identifying one or more updated content items matching the feed definition and populating the queue with a list of the identified one or more updated content items.

Certain embodiments may also include receiving FTP site credentials. In some embodiments, delivering the one or more content items comprises generating one or more files including the one or more identified content items on the list, accessing a FTP site using the FTP site credentials and delivering the one or more files to the FTP site.

The system for providing content syndication to subscribers includes a content database configured to store one or more tags and keywords with a plurality of content items and a syndication database configured to store a plurality of feed definitions, each feed definition specifying a desired type of content according to one or more selected taxonomies and keywords. The system further includes a processor, and a memory having executable instructions stored thereon that when executed by the processor cause the processor to identify one or more content items from the content database with one or more tags and keywords matching a given one of the plurality of feed definitions, populate a queue with a list of the identified one or more content items, and retrieve the one or more identified content items on the list from the queue.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
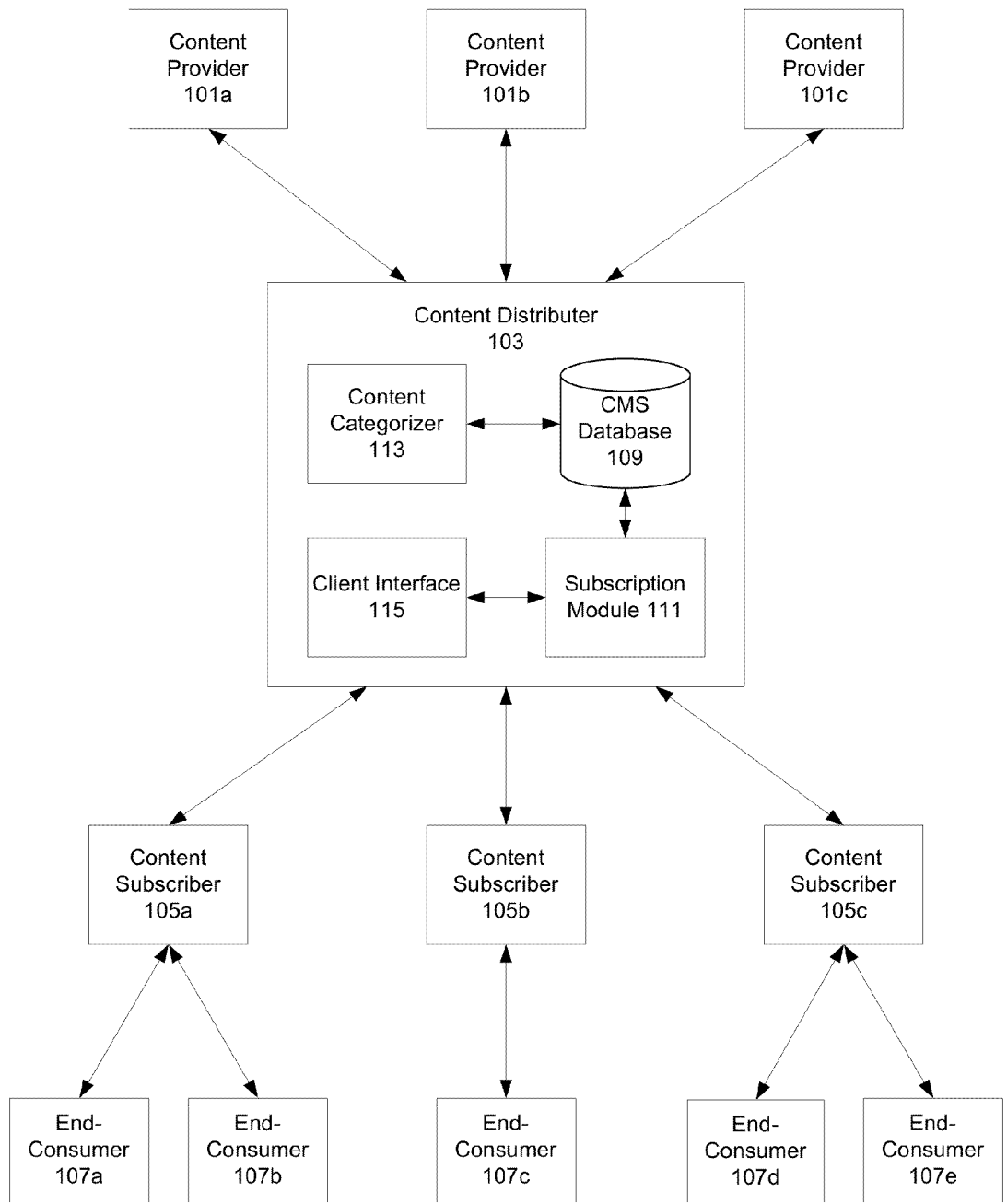
FIG. 1 presents a block diagram of a system for syndicating content according to an embodiment of the present invention.

FIG. 1 presents a block diagram of a system for syndicating content according to an embodiment of the present invention. The system includes content provider 101a, 101b, 101c, content distributer 103, content subscriber 105a, 105b, 105c, and end-consumer 107a, 107b, 107c, 107d, and 107e. Content providers 101a-101c may include third party sources, contributors, partners, freelance writers, or editors that provide information or content for dissemination to consumers of the general public, specific entities, or paying subscribers. Content provided by content providers 101a-101c may include printed or electronic works such as books, articles, magazines, periodicals, regulatory documents, scientific publications, reports and digital or multimedia content. The content from content providers 101a-101c may be digitally transmitted to, stored, and indexed at content distributer 103.

Content distributer 103 includes Content Management System (CMS) database 109, subscription module 111, content categorizer 113, and client interface 115. Content distributer 103 may be a web-based distributer or service provider offering distribution of the content from content providers 101a-101c to content subscriber 105a-105c. Content maintained at content distributer 103 may be stored in a CMS database 109. The content stored in the CMS database 109 may include, but are not limited to, video, audio, images, text, Portable Document Format (PDF) files, and any other types of file format supported by CMS database 109 of content distributer 103. According to one embodiment of the present invention, content distributer 103 may provide a web application or service that allows for the selection, queuing and distribution of the content items.

Content subscriber 105a-105c may subscribe to and receive specific content stored by content distributer 103. Management of subscriptions and content delivery may be handled by subscription module 111. The content subscribers 105a-105c may be businesses looking for content to host on their web sites or seeking to gather content for a collection or library. Content obtained by content distributer 103 may be gathered from a variety of sources and may be exclusive content unobtainable by other means, such as rare documents and media. Furthermore, content obtained by content distributer 103 may be through negotiations, deals, agreements, or licensing with content providers 101a-101c that would be inaccessible or more expensive to obtain by content subscriber 105a-105c on their own. Content stored in CMS database 109 may be ordered and categorized according to content taxonomies by content categorizer 113.

Subscription module 111 may gather and syndicate a plurality of desired content items and also regularly provide fresh content to content subscriber 105a-105c. The variety of content received may be based on definitions created by the subscribers 105a-105c. Each subscriber may create or define one or more feed definitions to create a content feed via a client interface 115. A subscriber may create any number of unique feed definitions. Content may be gathered by subscription module 111 according to each of the feed definitions and sent to subscribers 105a-105c. A feed definition may include desired taxonomies (or genres) and keywords contained in the content desired by a given content subscriber. Content matching the feed definitions may be syndicated to the subscribers via a feed to the subscribers' servers, CMS, repository, or made available for retrieval, which can be specified using the client interface 115. The content received by the subscribers may be received as specifically formatted files or markup language. These files may represent and include the entirety of the original contents maintained in the CMS of content distributer 103. In one embodiment, content syndicated to content subscribers 105a-105c may be received as Extensible Markup Language (XML) files. According to another embodiment, files may be received in the original format in which they were stored by content distributer 103.

Content subscribers 105a-105c may use the content provided by content distributer 103 for access by end-consumer 107a-107e. In one embodiment, content subscribers 105a-105c may be merchants selling various goods and services on their websites. End-consumer 107a-107e may be online visitors to the websites that are interested in the goods and services provided by content subscribers 105a-105c. To further educate and provide documentation or media not authored by content subscribers 105a-105c, the syndicated content may be available on their website to give more information to the user related to their products. For example, a content subscriber may sell wireless devices on its website and may want to provide additional information on wireless technology.

The look and feel of the content received from content distributer 103 may be formatted by content subscribers 105a-105c. According to an embodiment of the present invention, the content although not created by the content subscribers 105a-105c, may be configured to appear seamless to the end-consumer as if they were authored by the content subscribers. Through this, content subscribers are able to keep end-consumers on their web sites without redirecting end-consumers to other web sites. According to an alternative embodiment, certain portions of fields or content may be forced upon the subscriber or restricted from modification. The content received by subscribers 105a-105c may be further configured into other file formats from which it was received. For example, content received from content distributer 103 in a XML file may be rewritten into PHP, .NET, Java, or JavaScript files.

Figure 2:
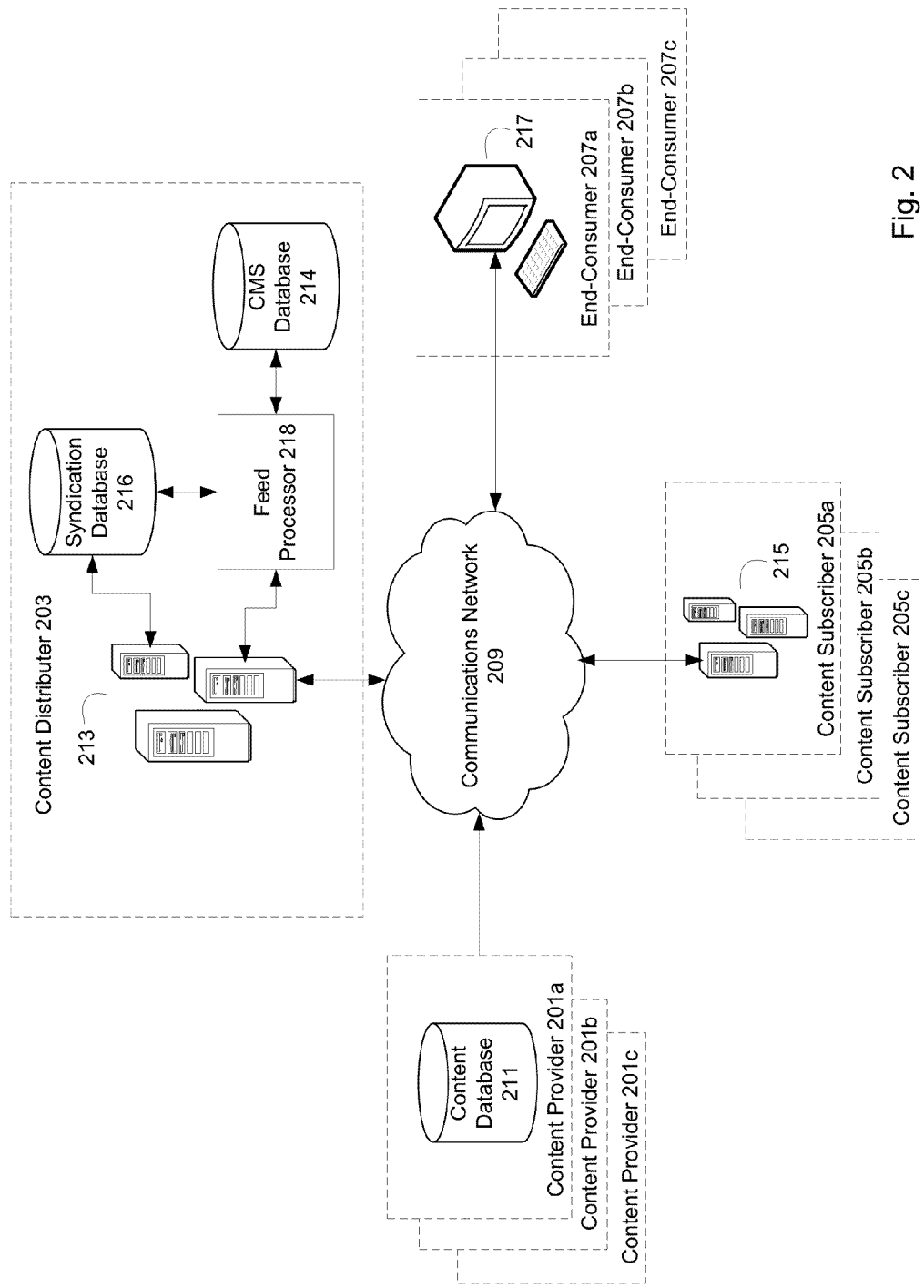
FIG. 2 presents a computing system for syndicating content according to an embodiment of the present invention.

FIG. 2 presents a computing system for syndicating content according to an embodiment of the present invention. The system includes content provider 201a, 201b, 201c, content distributer 203, content subscriber 205a, 205b, 205c, end-consumer 207a, 207b, 207c, and communications network 209.

Content provider 201a-201c includes content database 211. Content may be generated by content provider 201a-201c and respectively stored in content database 211. The content may be created by personnel at content provider 201a-201c on computers using word processing or other productivity software, or scanned from paper printed documents. Content distributer includes servers 213, CMS database 214, syndication database 216 and feed processor 218. Servers 213 at content distributer 203 may retrieve or receive content stored in database 211, via communications network 209, for storage into CMS database 214. The illustrated servers 213 may include one or more web servers, applications servers, load balancing servers, transaction servers, and File Transfer Protocol (FTP) servers.

CMS database 214 may be any open source (TYP03, Joomla!) or proprietary CMS (such as IBM Lotus Web Content Management). A CMS makes it easy to publish and administrate content. The CMS database may include a collection of procedures used to manage work flow in a collaborative environment. The procedures may be designed to do the following: allow for a large number of people to contribute to and share stored data; control access to data, based on user roles (defining which information users or user groups can view, edit, publish, etc.); and aid in easy storage and retrieval of data. The CMS may be used for storing, controlling, revising, semantically enriching, and publishing content items. Serving as a central repository, the CMS may provide version control and increase the version level of new updates to an already existing file. The CMS database stores articles and file names of digital assets. In one embodiment, the system may further include one or more replications of CMS database 214 (not illustrated) for the purposes of using a duplicate of CMS database 214 without affecting a production CMS database 214.

Either prior to or after storage into CMS database 214, content may be organized, segmented and tagged according to their topic, target, type, origin, purpose, etc. (or collectively referred to as "taxonomy"). CMS database 214 may be populated with a plurality of content items from content providers 201a-201c. In an alternative embodiment, CMS database 214 may be a central repository of content from other distributers such as content distributer 203. The central repository may include an open interface from other distributers' CMS databases to deposit content into the central repository. The taxonomy and identification of the content may be stored in a table or schema in CMS database 214, which is described in further detail with regard to FIG. 3B.

Content distributer 203 may receive content requests from content subscriber 205a-205c. Requests for content may include creating feed definitions. Once feed definitions are created they may be stored in syndication database 216 and processing of the feeds to locate content in CMS database 214 matching the feed definitions may be performed by feed processor 218. Feed processing may be performed periodically according to settings configured by content distributer 203, content subscribers 205a-205c, or an administrator of content database 211, and may be defined according to a number of minutes, hours, days, or months. Contents (or identifiers of the contents) found to match the feed definitions may be put into queues in the syndication database 216 for transmission or syndication to servers 215 via communications network 209. Servers 215 may include one or more file servers, web servers, FTP servers, or application servers, etc. Syndication of content may be accomplished via Simple Object Access Protocol (SOAP) or FTP, which are described in further detail regarding FIGS. 5 and 6.

The syndicated content may be made available to end-consumer 207a-207c by content subscriber 205a-205c in a variety of ways. In an exemplary embodiment, the syndicated content may be included on a product web site as reference or additional content. Content provided by content subscriber 205a-205c may be accessed by client 217 via communications network 209. Client 217 may comprise desktop personal computers, workstations, terminals, laptops, personal digital assistants (PDAs), cell phones, tablet personal computers, or any computing device capable of connecting to a network. Clients 217 may also comprise a graphical user interface (GUI) or a browser application provided on a display (e.g., monitor screen, LCD or LED display, projector, etc.). Communications network 209 may be any suitable type of network allowing transport of data communications across thereof. In one embodiment, the network may be the Internet, following known Internet protocols for data communication, or any other communication network, e.g., any local area network (LAN), or wide area network (WAN) connection.

Figure 3A:
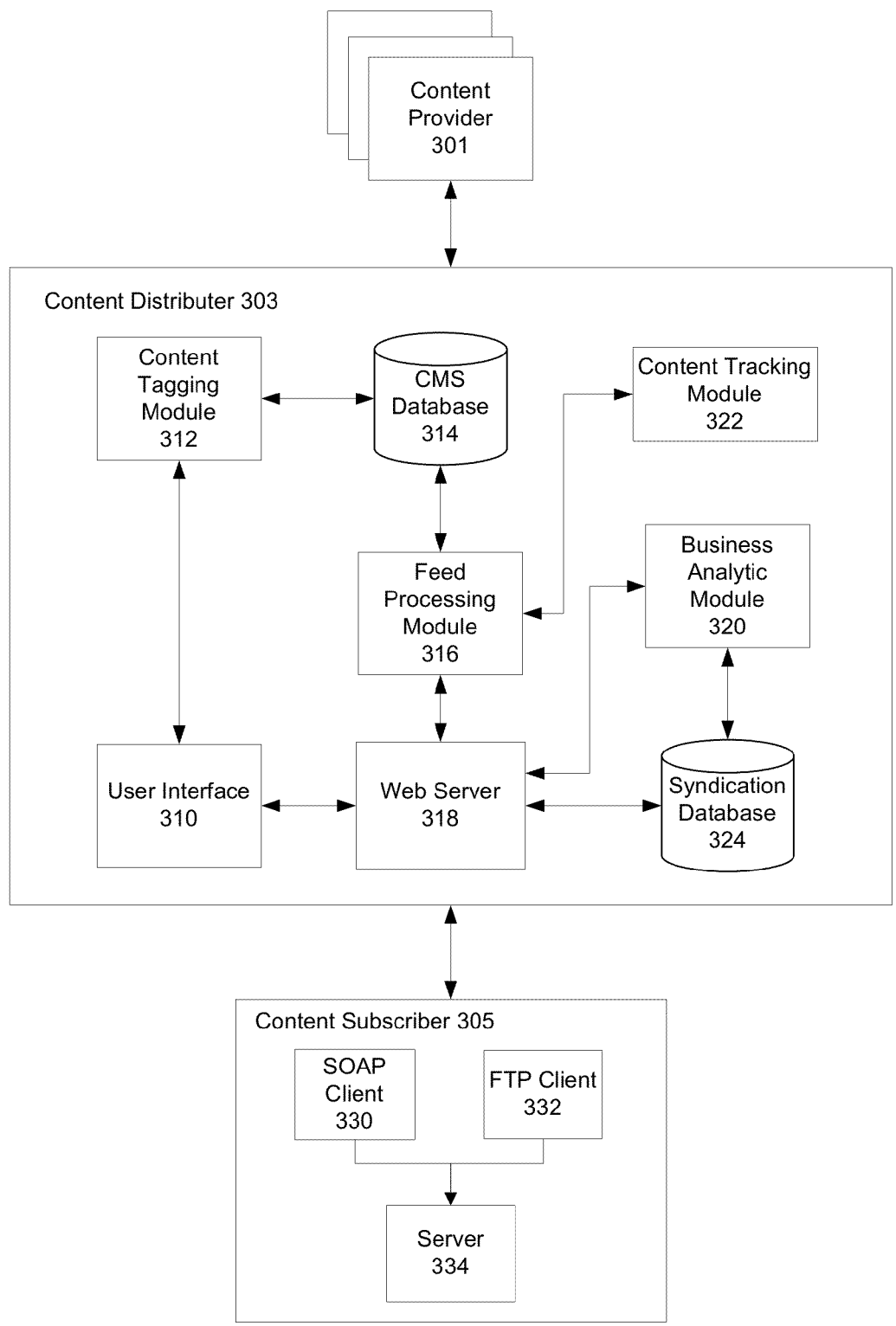
FIG. 3A presents a component diagram of a system for syndicating content according to an embodiment of the present invention.

FIG. 3A presents a component diagram of a system for syndicating content according to an embodiment of the present invention. The system includes content provider 301, content distributer 303 and content subscriber 305. Content distributer 303 further includes user interface 310, content tagging module 312, CMS database 314, feed processing module 316, web server 318, business analytic module 320, content tracking module 322 and syndication database 324.

Content provider 301 provides content to content distributer 303. Content tagging module 312 may tag the content that is received by content distributer 303 from content provider 301. Content may be tagged with the taxonomies or keywords, and indexed in CMS database 314 with the tags. Tagging may be performed either manually by, for example, a human editor or, an automated process using training samples from the human editor in well-known learning algorithms. For example, subject matter of the content may be extracted and used to determine appropriate tags. In another embodiment, tagging module 312 may be a part of, or an interface to CMS database 314. The data stored in the CMS database 314 includes article content, path and file names for digital assets, and taxonomy categories. CMS database 314 is accessed by feed processing module 316 to identify content that meets the criteria defined in feed definitions. From time to time, new or updated content may be added to CMS database 314. Feed processing module 316 may be scheduled to identify content matching the feed definitions on a periodic basis to provide subscribers with fresh content. According to an alternative embodiment, the content can be queued on-demand, as requested by a subscriber.

Figure 3B:
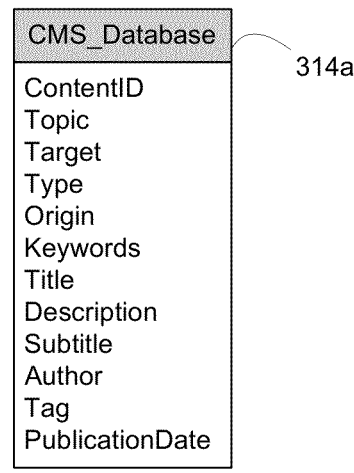
FIGS. 3B and 3C presents database schemas of a system for syndicating content according to an embodiment of the present invention.

FIG. 3B illustrates one embodiment of how content and information associated with the content may be stored in CMS database 314. Entity 314a includes a schema for storing and indexing content including, but not limited to, ContentID, Topic, Target, Type, Origin, Keywords, Title, Description, Subtitle, Author, Tag(s), and PublicationDate fields. Content may be searched using the fields to match the criteria of feed definitions created by subscribers. In one embodiment of the present invention, a table such as the one illustrated in FIG. 3B may be created for article content while another similar or identical table may be created for digital assets. According to another embodiment, taxonomy categories (e.g., topic, target, type and origin) may be stored in additional tables, one for article content and another for digital assets. In yet another embodiment, the present invention may include an index or table of matching content and taxonomy categories for both of article content and digital assets.

Referring back to FIG. 3A, User interface 310 may include an application which executes in a web browser used by a subscriber to log in, create, view, edit, delete and lock feed definitions, select the taxonomies or keywords to associate with the feed definitions, review changes to taxonomy and keywords prior to committing changes, preview the results that a feed definition will return, generate and save reports, and schedule reports to be sent via email. A subscriber may login at user interface 310 to web server 318 with credentials such as a username or email and password. Subscriber and login information may be stored in syndication database 324. When a user logs into the web server 318, the user may be automatically redirected to an encrypted webpage using well-known web encryption methods such as Secure Sockets Layer (SSL) or Hyper Transfer Protocol Secure (HTTPS). According to one embodiment, all web service method calls associated with the user interface 310 may also utilize SSL/HTTPS.

The user interface 310 may include two levels of interfaces, one for subscribers and one for administrators. Administrative users of the content distributer 303 may have access to additional functionality within the user interface 310 such as the ability to add subscribers, add logins for users, and selecting the taxonomies made available for usage, as well as managing feed definitions. According to one embodiment of the present invention, user interface 310 may further include an administrative interface for managing subscribers, logins, feeds, reports, and advanced reporting. Functionality of the user interface available to subscribers may include a subset of the functionalities available to administrative users.

Feed definitions may be created by providing a feed name, a media type, a delivery method (or preference), a recency criterion, a number of hours between feed processing (e.g., for selecting certain hours to deliver already-queued content via FTP), taxonomy, and keywords. The media type may be selected from a list of supported files and the delivery method may be selected from a list of available options, for example, SOAP or FTP. If FTP method is chosen, FTP credentials may need to be provided. FTP credentials may include FTP server name, FTP user name, FTP password and an FTP remote path. The recency criterion within a given feed definition allows a user to choose how recent content must be, i.e., content age. Options for recency criterion may include, for example, selecting content items that are a week, a month, three months, six months, a year or two years old. Selecting recency may be optional and need not be selected, in which case the publication dates of content items are not considered in queuing and previewing feed definitions.

Figure 3C:
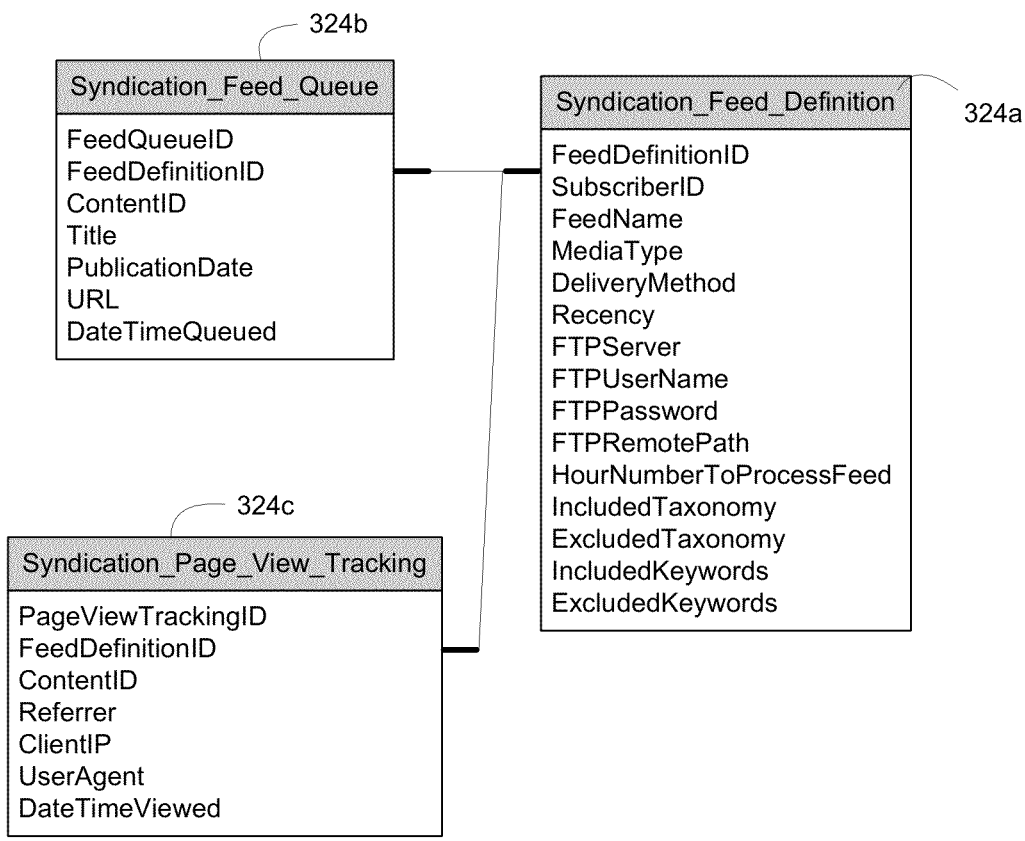

Feed definitions may be created on web server 318 and stored on syndication database 324. FIG. 3C illustrates an exemplary embodiment of a database schema for feed definitions stored in syndication database 324. Syndication database 324 includes Syndication_Feed_Definition 324a, Syndication_Feed_Queue 324b, and Syndication_Page_View_Tracking 324c. Syndication_Feed_Definition 324a includes FeedDefinitionID, SubscriberID, FeedName, MediaType, DeliveryMethod, Recency, FTPServer, FTPUserName, FTPPassword, FTPRemotePath, HourNumberToProcessFeed, IncludedTaxonomy, Excluded Taxonomy, IncludedKeywords, and ExcludedKeywords fields.

Referring to FIG. 3A, the taxonomy of the content may be selected for the feed definition from a list of available taxonomies provided by content distributer 303. Taxonomies may be included in or excluded from feed definitions. In one embodiment, a taxonomy element may be selected for inclusion or exclusion by selecting the taxonomy from an available list of taxonomies to corresponding lists for inclusion or exclusion. For example, a feed definition may specify to include articles about electricity (or include articles with "electricity" tags) and exclude articles about coal (or exclude articles with "coal" tags).

In another embodiment, the availability of taxonomies available for selection may differ for articles and digital assets. Digital assets include non-article items such as video, audio, images, etc. In addition to defining the taxonomy for a desired feed, a list of keywords may also be provided for inclusion or exclusion from the feed. The list of keywords may either be input as free-form text or selected from a list of keywords, e.g., popular keywords based on the selected taxonomies. For each set of included or excluded taxonomy or keywords, subscribers may use any Boolean logic combination to define their desired content. For example, whether all taxonomy or keywords within the section need to be present for it to be considered a match, or if instead any of the taxonomy or keywords needs to be present.

Subscribers may be allowed to experiment with different taxonomy, keywords, or recency criteria, and preview feed definitions without affecting a feed in production. A temporary feed may be created containing the same attributes as the feed being modified and allows the subscriber to view the number of results as well as the results themselves before committing the changes to an actual feed definition. This process may involve sending data to web server 318 of a feed definition being modified and the changes being made (e.g. new taxonomy to be included or excluded). Based on the changes made to the taxonomy or keywords, each attribute may be copied from the original feed definition to a temporary feed and the changes made are applied to the temporary feed. Next, a process may be called which places any matches for the temporary feed into a feed queue. Results are returned to the subscriber representing the type of content a feed will produce, which can be viewed in advance before committing the change to the feed definition.

When a feed definition is put into production or when content is received by a subscriber from a feed, the subscriber may have the option of locking the feed. When a feed is locked, it is not able to be edited in any way such as changing the taxonomy or keywords, and even from deletion. If a feed is locked, a user must provide a special unlock password before any changes can be made. This extra layer of security significantly reduces any risk of the type of content being delivered from a feed from being modified inadvertently. The unlock password may be set up by either a subscriber or an administrator.

The number of hours is configurable between feed processing. A feed processing interval may be defined in which new content is searched for in CMS database 314. Feed processing module 316 may process each feed to gather content from CMS database 314 which is then added to a feed queue in syndication database 324 by web server 318. According to table 324b in FIG. 3C, a syndication feed queue may include FeedQueueID, FeedDefinitionID, ContentID, Title, PublicationDate, URL, and DateTimeQueued fields. At regularly defined intervals, a scheduled procedure or processing may be executed which goes through each feed definition and locates any content that matches the requested criteria (media type, taxonomy included/excluded, keywords included/excluded). The criteria in the feed definitions may be compared with taxonomy tags and keywords associated with the content items.

In one embodiment, the Recency field of a feed definition may also be compared with the publication dates of the content items. Contents with publication dates older than a time period specified in the Recency field may be filtered out. Selecting content items to satisfy a recency criteria defined in the Recency field may include retrieving a current date and time, subtracting the recency time period from the current date and time, and selecting content items that are newer than the date resulting from the subtraction. The IDs of content items meeting the criteria in the feed definitions may be placed in a feed queue within a table of the syndication database 324 along with the ID of the feed definition. The feed queue may include a unique ID, title, publication date, Uniform Resource Locator (URL), and date/time queued for each content.

Content items produced from feed definitions may be delivered to a subscriber in specific file formats. According to one embodiment of the present invention, content may be provided to subscribers as XML documents. Feed processing module 316 is also operable to process and create XML files upon retrieval of files on a feed queue. Content may be processed as either an article or a digital asset by content distributer 303. Articles may be processed by parsing its text and links to any images or items embedded within the articles. Text can be parsed and extracted from articles and formatted into title, subheading, body text, keywords, etc., headers in an XML file. Digital assets may be processed by extracting link, paths or URLs to download the digital assets. XML files for non-article contents (digital assets) may be formatted with metadata and one or more links to download the non-article content. In an alternative embodiment, pre-processing and pre-creation of XML files may be performed for specific content items eliminating the need to process the content items every time they are encountered in a feed. Pre-processing and pre-creation of feed content may be performed for frequently accessed content to reduce processing and computing resources. The file format in which content is delivered to a subscriber is not limited to XML files and may be produced in any markup language document, text, or binary file format.

Content may be syndicated to content subscriber 305 in one of two methods for retrieving content. Subscribers can choose to retrieve the content via a SOAP web service or the content can be delivered to them automatically via FTP. The method of delivery is selected when creating a feed definition and may be changed at any time. A user may initiate web server 318 to request content files from SOAP client 330 for feed definitions specifying SOAP delivery. When the method of delivery for a feed specifies FTP delivery, web server 318 may authenticate itself to the content subscriber's FTP site via FTP client 332. The content subscriber's FTP site may be hosted, for example, on server 334. Server 334 may include FTP servers, web servers, and application servers. SOAP client 330 and FTP client 332 may include script provided by content distributer to facilitate content reception. Once content is received, it may be delivered to and stored on server 334 where it may process, use, and/or publish the content.

Web server 318 may also generate reports from logs of the content transferred to subscribers and the views received by the transferred content. As each content element is retrieved by a subscriber, an entry is made to a syndication content log table within the syndication database 324 including the feed definition ID, the date and time it was distributed, and the subscriber ID. This information may be used to generate reports, either manually via the user interface 310 or automatically each month and sent via email to the subscriber. The log and report provides a complete record of the content distributed.

Content distributed to content subscriber 305 may also contain tracking items or software generated by content tracking module 322. Content tracking module 322 may embed tracking to each or a selective few of the content items processed by feed processing module 316. In one embodiment of the present invention, within the body text of an article or in the description of a digital asset, a reference or link to a tracking object created by content tracking module 322 is appended to the content items. When the content items are retrieved by the subscriber, an entry is created in a syndication page view table within syndication database 324. The entry may include a unique ID of the content element, the feed definition ID, a page view tracking ID, the URL of the page where the content is being viewed (or the referrer), the date and time the content was viewed, the IP address of the user accessing the content, and the user agent information of the browser accessing the content. Table 324c in FIG. 3C illustrates an exemplary table in which tracking information may be stored in syndication database 324. This information may then be used to generate reports of the views of each content item, either in summary or complete detail. Reports may be generated by creating a temporary table representing the data to be included, and then writing the data contained within that temporary table into a comma separated value (CSV) file for easy viewing in spreadsheet applications or importing into business analytics systems. The reports may be stored in a temporary folder on the web server 318 for a short period of time, after which they are automatically deleted.

Business analytic module 320 may retrieve the logs stored in syndication database 324 or the generated reports to analyze the content retrieved by subscribers and the views the content had received. Frequently accessed content may be determined from the logs and well as the type of contents that are frequently accessed. Analysis indicating frequently accessed content may be used to determine pre-processing and pre-creation of feed content performed by feed processing module 316. Business analytic module 320 may also use the analysis to determine a subscription fee for content subscriber 305 for the services of content distributer 303. The subscription fee may be based on the amount of content received by content subscriber 305 or the amount of times the content items received by content subscriber 305 were viewed. Fees may be established on a monthly, quarterly, or yearly basis.

Figure 4:
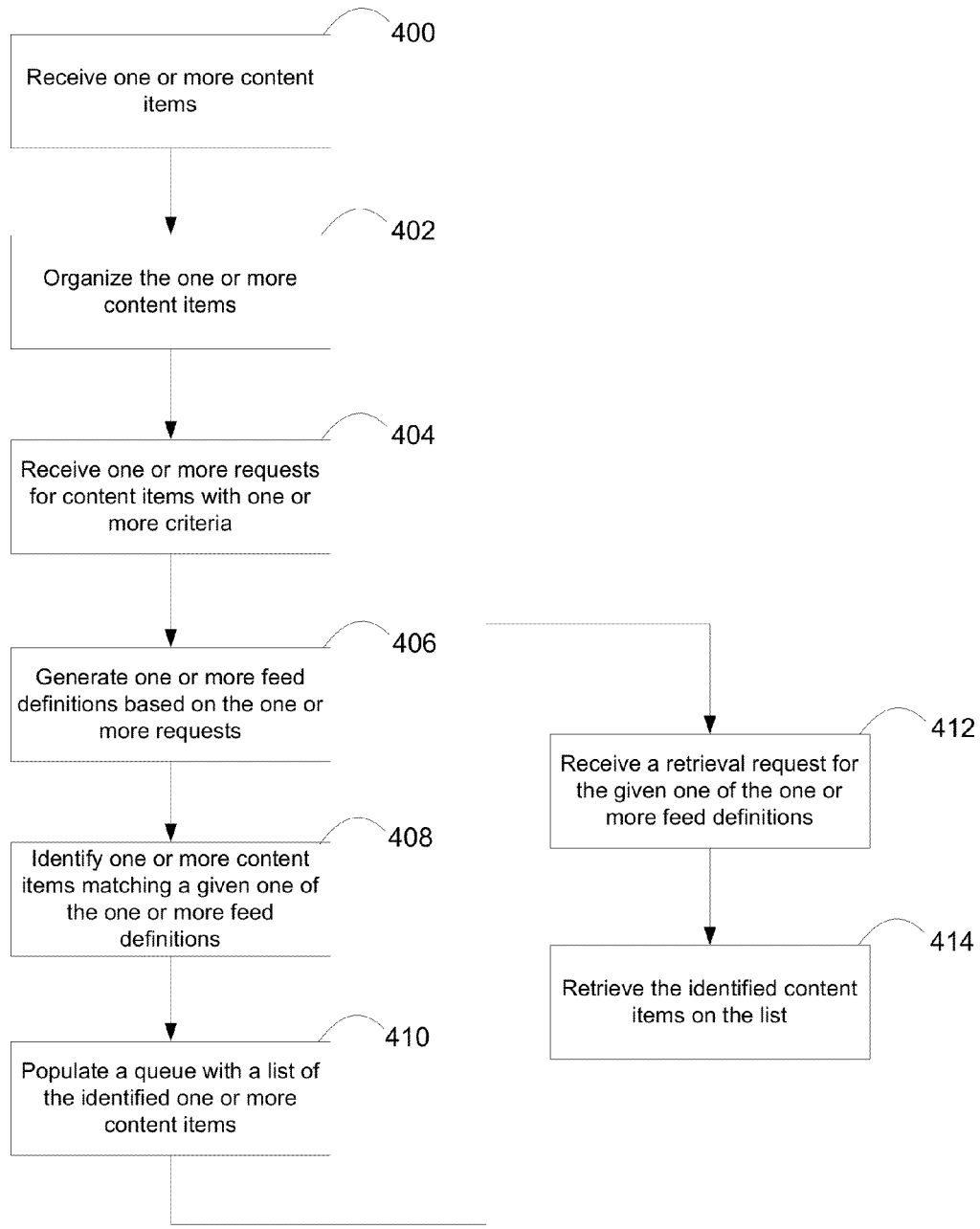
FIG. 4 presents a flowchart of a method for syndicating content according to an embodiment of the present invention.

FIG. 4 presents a flowchart of a method for syndicating content according to an embodiment of the present invention.

One or more content items is received, step 400. The one or more content items may be received from one or more content providers and stored in a CMS database at a content distributer. Content may be added to, edited or updated in the CMS database. In a next step 402, the one or more content items are organized, step 402. The content items may be clustered based on their content according to well-known clustering algorithms and indexed with one or more tags. Content items may be tagged with one or more taxonomies and keywords descriptive of their subject matter or content fields including the title, description, subtitle, etc.

Step 404 includes receiving one or more requests for content with one or more criteria. Receiving one or more requests may include receiving criteria from one or more subscribers defining desired content. The criteria may include a type of content (e.g., article or digital asset), a transmission method (e.g., SOAP or FTP), a recency criterion, desired taxonomies and desired keywords. One or more feed definitions are generated based on the one or more requests, step 406. The one or more feed definitions are created from the criteria specified by the one or more subscribers. According to an alternative embodiment, generating one or more feed definitions may also include providing previews of the one or more feed definitions.

In a next step 408, one or more content items matching a given one of the one or more feed definitions are identified. The one or more feed definitions may be used to locate any content in the CMS database of the content distributer that matches the one or more criteria specified in the given feed definition. Matching of the content item to the feed definition may include comparing a recency criterion, desired taxonomies and desired keywords defined in the given feed definition with the tags, title, description, publication date and metadata, etc., of the one or more content items. The matching may be performed periodically or at intervals defined by the subscriber or the content distributer. In one embodiment, the matching may be performed on-demand, which can be requested by a subscriber or an administrator.

A queue is populated with a list of the identified one or more content items, step 410. As content matches are identified, the content items may be placed in a feed queue associated with the given feed definition. The IDs of the content items may be placed in the queue within the syndication database along with the ID of the feed definition. Content items placed in feed queues are indicated as ready for syndication to the subscriber.

A retrieval request for the given one of the one or more feed definitions is received, step 412. The retrieval request may be received from a content subscriber desiring content that has been found for the given one of the one or more feed definitions. The request may be made from using a SOAP client requesting SOAP transmission of the content. An array of IDs for the contents may be retrieved from the feed queue with a feed definition ID associated with the given feed definition. In step 414, the identified content items on the list are retrieved. The content items on the list may require additional processing or preparation before syndication to the content subscriber.

In one embodiment, the type of content of the given feed is determined. Each of the identified content items from the CMS database may be parsed and extracted into individual files. A temporary folder may be created for the given feed to store the individual files to be delivered to the subscriber. Body text, as well as the title, subtitle, description, author, keywords of the identified content that are articles may be extracted into the individual files. Articles may also be scanned to search for embedded links and images. If links are found, they may be examined to verify their accessibility by the receiving subscriber and by other external parties.

For example, relative links which are accessible only by intranet or local network users are inaccessible to outside users. According to one embodiment of the present invention, relative links may be converted to absolute/universal links, paths, or URLs that would be accessible to any user. Embedded images in an article may be determined whether they are hosted on the CMS database or stored at an external source and accessible links to the embedded images are retrieved. Links and links to embedded images may then be included in the individual files along with the extracted body text of the articles. Similarly, accessible links or paths to digital asset or non-article contents from the CMS database are retrieved and extracted into individual files. Metadata of the non-article content may also be extracted into the individual files containing the links to the non-article contents.

The individual files containing the contents matching the given feed definitions are delivered to the subscriber from the temporary folder. In another embodiment, the identified content items may be delivered to the subscriber in their original format. After successful syndication or delivery of the content to the subscriber, the IDs of the content items may be removed from the queue associated with the given feed definition. Any content that was unavailable for retrieval from the CMS database or undeliverable may remain the feed queue until they are received by the subscriber. The individual files of content may be retrieved or delivered by either SOAP retrieval or FTP delivery, which are described in further detail with regard to FIGS. 5 and 6. In another embodiment, the binary data of the individual files may be transmitted via SOAP using Message Transmission Optimization Mechanism (MTOM). The above steps may be repeated by the subscriber to receive updated content added to the CMS database that may match the criteria of the given feed definition.

According to an alternative embodiment of the present invention, a subscriber may receive JavaScript files from the content distributer. The JavaScript files may include content (either article or digital asset) and can be placed into a webpage hosted by the subscriber. For example, the JavaScript may include code or instructions to deposit a headline on a landing page of the subscriber's webpage in real-time that allows visitors to the subscriber's webpage to click on the headline to retrieve the full article or content. The article or content may be delivered via another webpage publishing the content or a link.

In another embodiment, content from the CMS database may be transformed or integrated into advertisements. For example, content retrieved from the CMS database for a feed definition may be transformed into advertisement images. A feed definition may be processed and return a list of content to merge with an image, JavaScript, or a document used by an advertisement server. Advertisements may be updated to daily to include headlines corresponding to the content received on that day associated with a feed definition.

Figure 5:
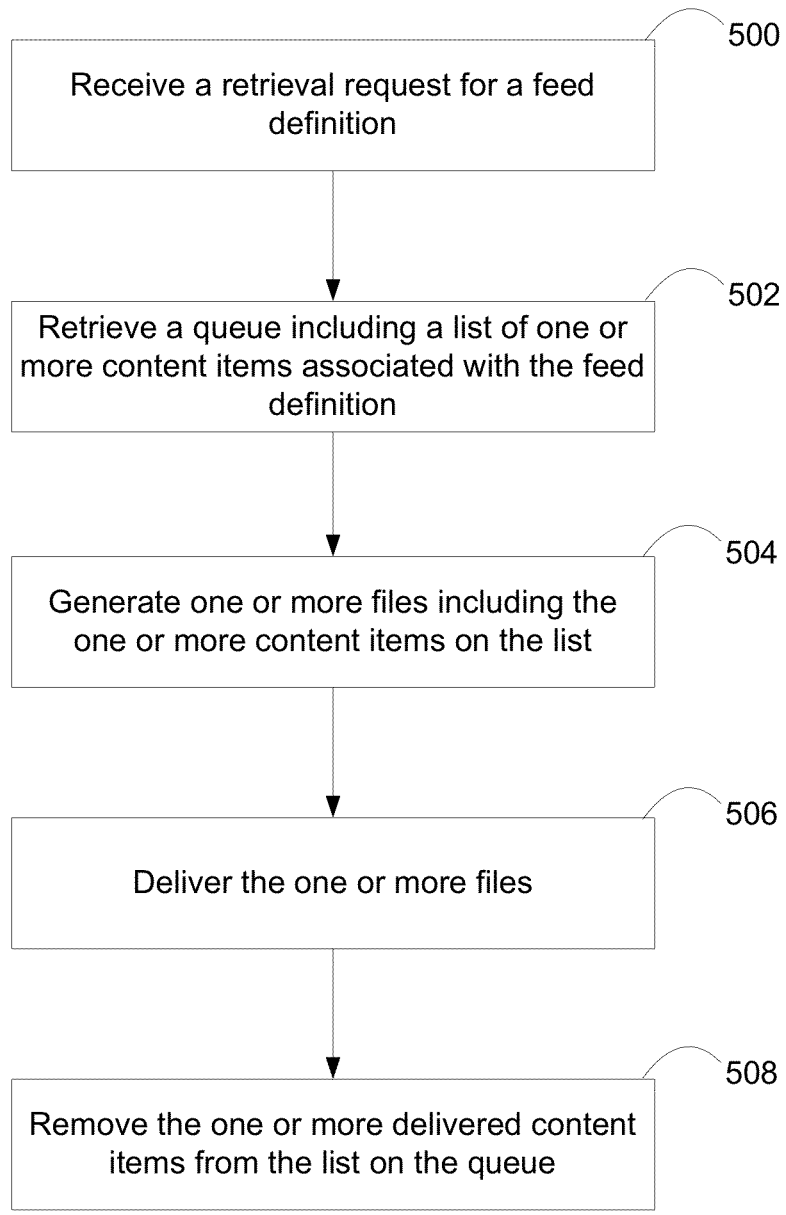
FIG. 5 presents a flowchart of a method for syndicating content to a SOAP client according to an embodiment of the present invention.

FIG. 5 presents a flowchart of a method for syndicating content to a SOAP client according to an embodiment of the present invention.

A retrieval request for a feed definition is received, step 500. A subscriber may submit a request to retrieve content found for a feed definition created by the subscriber. The subscriber may login and submit the ID of the feed definition the subscriber is requesting using a SOAP web service client. In a next step 502, a queue including a list of one or more content items associated with the feed definition is retrieved, step 502. The queue may store all of the content items found in a given instance from the CMS database of a content distributer that matches the criteria of feed definition created by the user. A list of unique IDs of the content within a feed queue corresponding to the identified feed definition may be retrieved. The unique IDs identify a corresponding content in the CMS database to retrieve.

One or more files including the one or more content items on the list are generated, step 504. For each item on the content list, the items on the list are determined whether they are articles or digital assets based on the media type of the feed definition in order to retrieve the content. In retrieving the content items, the entirety of the content items are extracted into one or more files. As an example, the one or more files may be XML documents. The XML files may contain the entirety of the information contained in the content items stored in the CMS database. XML files of articles may include the full text of the articles as well as any links and links to images contained in the articles. If the content items are digital assets (audio or video file, PDF, code, etc.), then the XML files may include a link to download the electronic file. In another embodiment, metadata of the content as well as the binary data of the digital assets may be provided within a SOAP response rather than in an XML document.

The one or more files are delivered in step 506. The one or more files may be delivered to a subscriber using SOAP transmission over application layer protocols such as HTTP or HTTPS. As each file or content is received by the subscriber, a log may be created including the feed definition ID, the date and time it was distributed and the subscriber's ID in a syndication database of the content distributer. The log may be used for confirming the receipt of the files and generating a report to provide a complete record of the content distributed. After successful delivery of the one or more files, the one or more delivered content items are removed from the list on the queue, step 508. An instruction may be called with the ID of the delivered content items and the feed definition ID to remove the content items from the feed queue.

Figure 6:
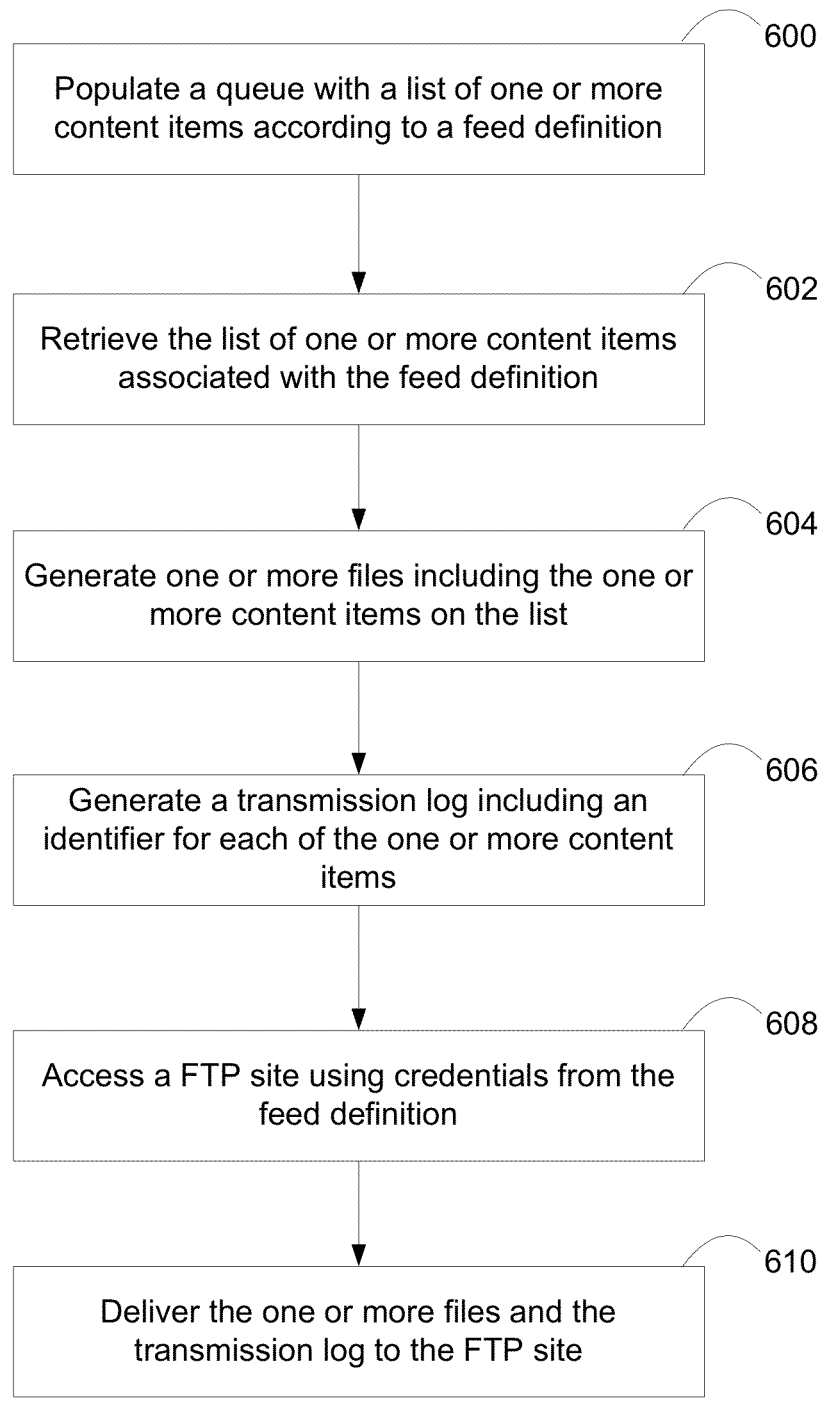
FIG. 6 presents a flowchart of a method for syndicating content to a FTP client according to an embodiment of the present invention.

FIG. 6 presents a flowchart of a method for syndicating content to a FTP client according to an embodiment of the present invention.

A queue is populated with a list of one or more content items according to a feed definition, step 600. A feed definition may be configured to deliver the one or more content items from a content distributer via FTP. Credentials regarding the subscriber's FTP site including FTP server name, FTP user name, FTP password and an FTP remote path may be provided in the feed definition. The content distributer may initiate a FTP transmission to syndicate the one or more content items to the subscriber of the feed definition. A feed definition may be processed to find content items in a CMS database of the content distributer that matches the criteria of content specified in the feed definition. According to one embodiment of the present invention, FTP transmissions may be initiated after completion of the processing of a feed definition. FTP transmission may also be scheduled at a given time or interval specified by the content distributer or the subscriber. The subscriber may also be notified by an email when a FTP transmission is ready.

In step 602, the list of one or more content items associated with the feed definition is retrieved, step 602. The queue may store all of the content items found in a given instance from the CMS database of a content distributer that matches the criteria of feed definition created by the user. A list of unique IDs of the content within a feed queue corresponding to the identified feed definition may be retrieved to identify a corresponding content in the CMS database to retrieve.

One or more files including the one or more content items on the list are generated, step 604. For each item on the content list, the items on the list are determined whether they are articles or digital assets based on the media type of the feed definition in order to retrieve the content. In retrieving the content items, the substance of the content items are extracted into one or more files based on the content or media type of the feed definition. In a next step 606, a transmission log including an identifier for each of the one or more content items is generated. The transmission log may include an entry for each file that is transferred. The format of the files in which the one or more content items are delivered may be produced in any markup language document or text file format.

A FTP site is accessed using credential from the feed definition, step 608. The content distributer may log into the subscriber's FTP site using the credentials provided within the feed definition. A subfolder may be created at the FTP site based on the FTP remote path specified in the feed definition. When the subfolder is created, the one or more files and the transmission log are delivered to the FTP site, step 610. The subscriber may read the transmission log by script or an automated process to confirm the receipt of the files. The one or more delivered content items may be deleted from the list on the queue upon delivery of the one or more files.

Figure 7:
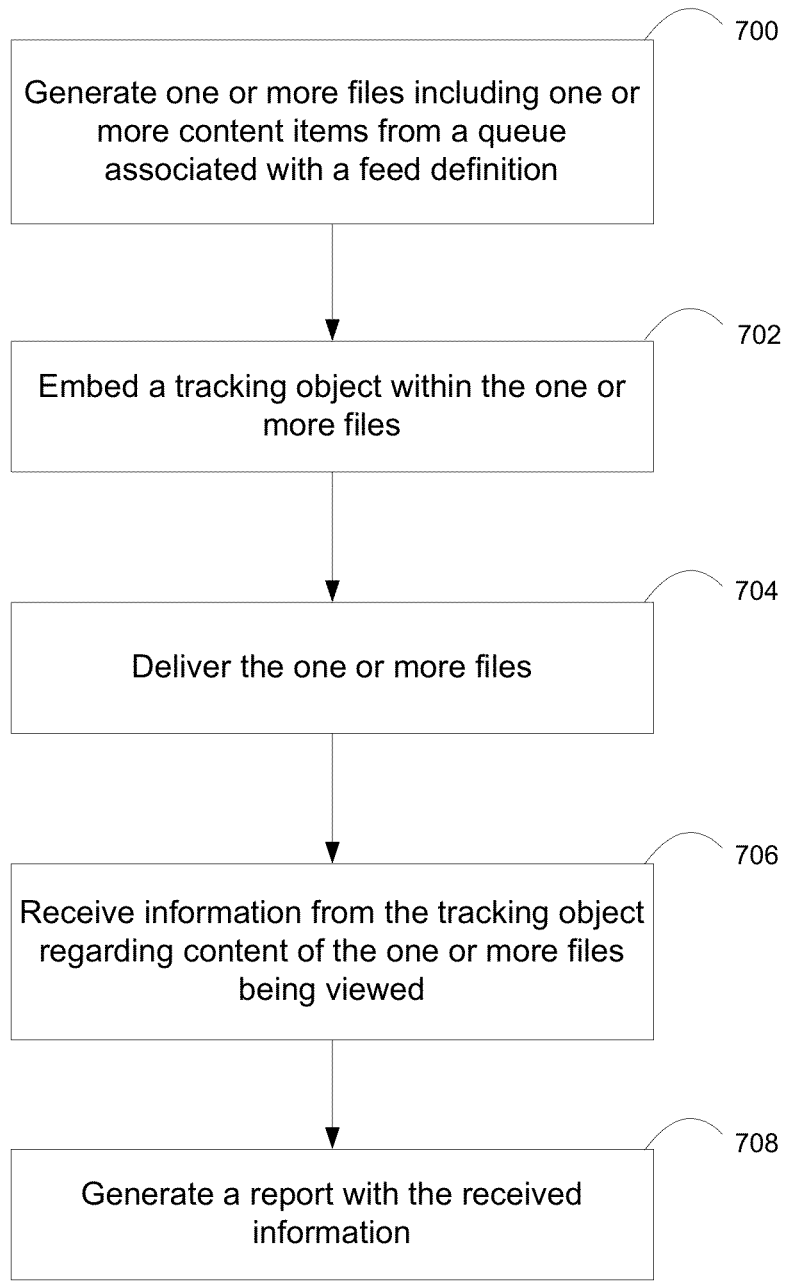
FIG. 7 presents a flowchart of a method for generating a report from tracking syndicated content according to an embodiment of the present invention.

FIG. 7 presents a flowchart of a method for generating a report from tracking syndicated content according to an embodiment of the present invention.

One or more files including one or more content items from a queue associated with a feed definition are generated, step 700. Similar to FIGS. 6 and 7, content items are retrieved from a content distributer from a CMS database based on a feed definition for delivery to a subscriber. The entirety of the content items may be extracted into one or more files or streams based on the content type of the feed definition. In creating the one or more files, a tracking object is embedded within the one or more files, step 702. The tracking object may be any object that when embedded in the one or more files allows detection that a user has viewed or accessed the contents of the one or more files. In one embodiment, tracking objects may be stored or hosted at the content distributer. For example, a tracking object may be an image or a tag element embedded within a file or stream such that when the file is accessed, a request is made to download the image or tag. The request to download the image or tag is made to the content distributer, allowing the distributer to detect when the content of the one or more files has been viewed. In an alternative embodiment, the content distributer may also embed tracking objects within the content items stored in the CMS database.

The one or more files are delivered, step 704. The files may be delivered to the subscriber in a normal manner by using SOAP to gather information on the files, and using retrieval methods, such as cURL, or FTP to retrieve the files. In a next step 706, information from the tracking object regarding content of the one or more files being viewed is received. The information collected is used to generate a report with the received information, step 708. The report may include the subscriber, a feed definition ID, the ID of the contents, the number of views of the contents by end-consumers, the Internet Protocol (IP) address of the end-consumers, the browsers used to view the contents, and the date and time of each view. According to one embodiment, the collected information used to generate the report may also be used to bill the subscriber a fee or rate based on the views of the content.

Figure 8:
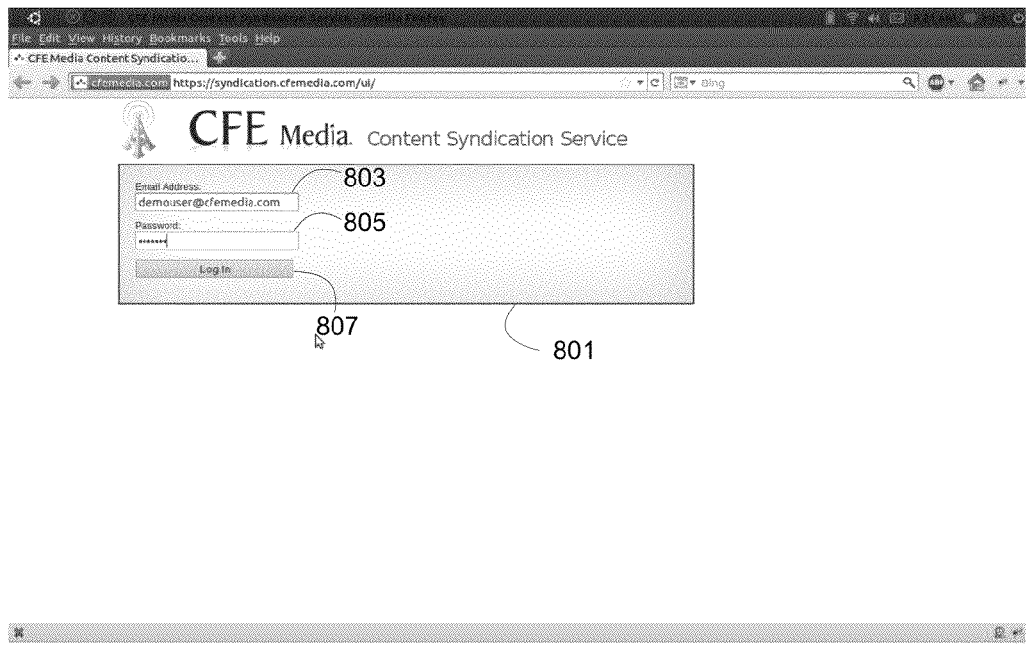
FIG. 8-21 presents exemplary screenshots of an interface for using a system for syndicating content according to embodiments of the present invention.

FIG. 8 illustrates a login window 801 for accessing the syndication service of the present invention. Login window 801 includes an email address field 803, a password field 805 and a log in button 807. A user may provide the requested credentials prompted by login window 801 to gain access their subscriptions or feeds. Accessing the syndication service is not limited to the illustrated fields and may include other types of credentials such as a username, phone number, zip code, etc.

Figure 9A:
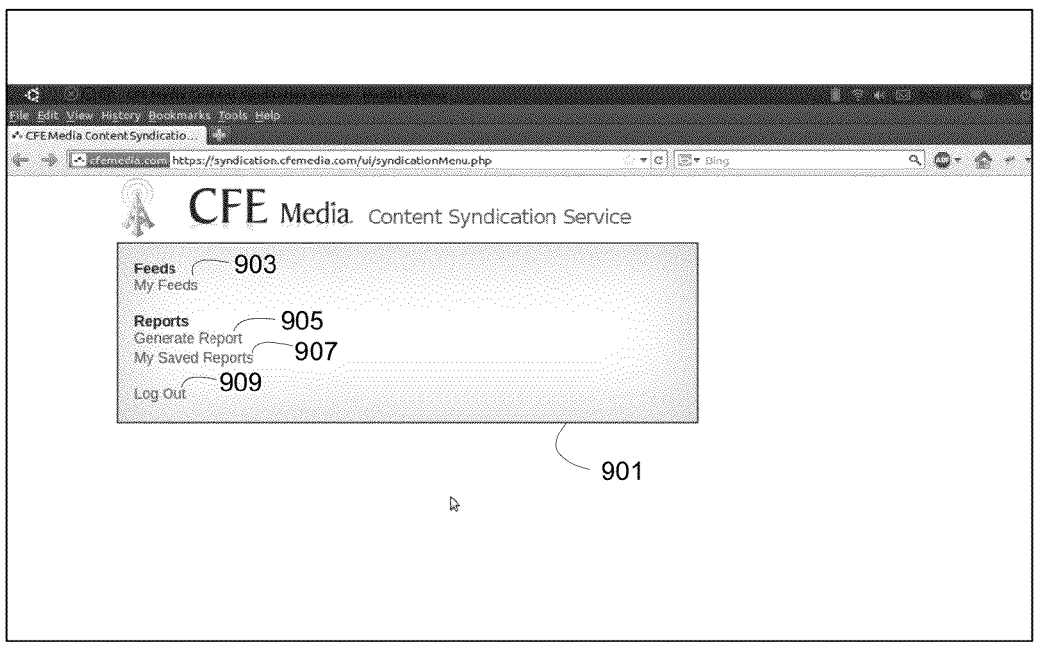

Upon verification of the credentials provided in login window 801, a user may be presented a menu of actions available to a subscriber as illustrated in FIG. 9A. The features shown in window 901 include My Feeds 903, Generate Report 905, My Saved Reports 907 and Log Out 909. My Feeds 903 may allow a subscriber to view his/her feeds. Reports may be generated using element 905. Reports that are generated using element 905 may be saved and viewed at a later time by accessing My Saved Reports 907. Log Out 909 signs a user out of the syndication service.

According to another embodiment of the present invention, a user may be identified as an administrator user and is presented with window 900 illustrated in 9B. Actions available to an administrator may include additional features not available to a subscriber user. An administrator may be presented with options for selecting taxonomy for syndication of articles 902 and digital assets 904, options for managing subscribers 906, subscriber feeds 908, and subscriber logins and saved reports 910. Window 900 may also include Generate Report 912 and Log Out 914.

Figure 10:
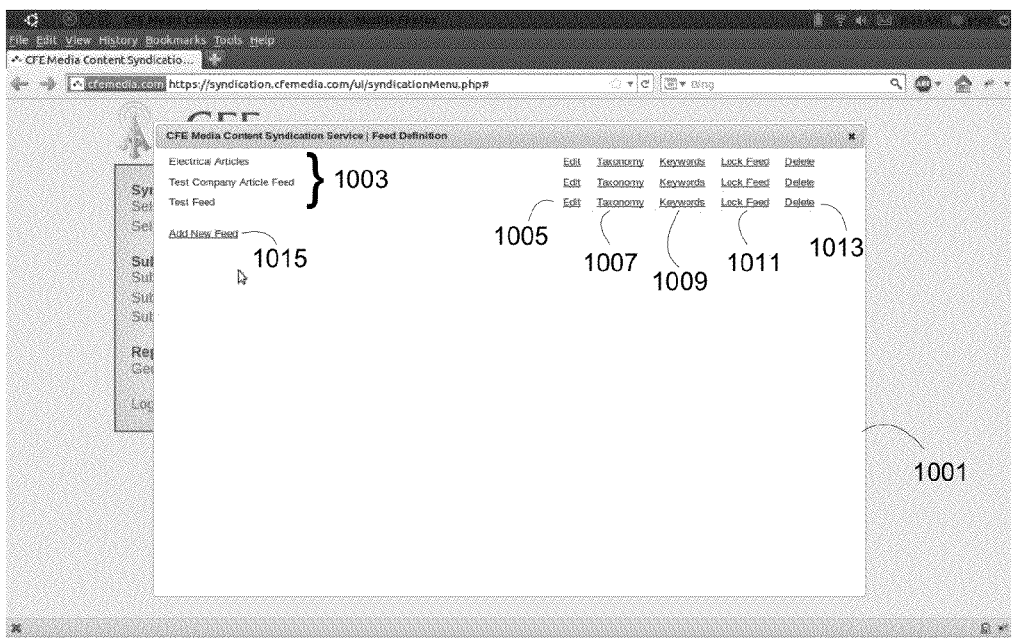

Subscribers and/or administrators may have the option of viewing and editing feed definitions as illustrated in FIG. 10. FIG. 10 presents a window 1001 including a list of feeds 1003, edit links 1005, taxonomy links 1007, keywords links 1009, lock feed links 1011, delete links 1013 and an add new feed link 1015. Edit links 1005 may allow a user to edit or modify the settings for a feed. Taxonomy links 1007 and keywords links 1009 may be selected to define the taxonomies and keywords associated with a feed. Lock feed links 1011 allows a user to lock a feed and delete links 1013 allows a user to delete a feed.

Figure 11:
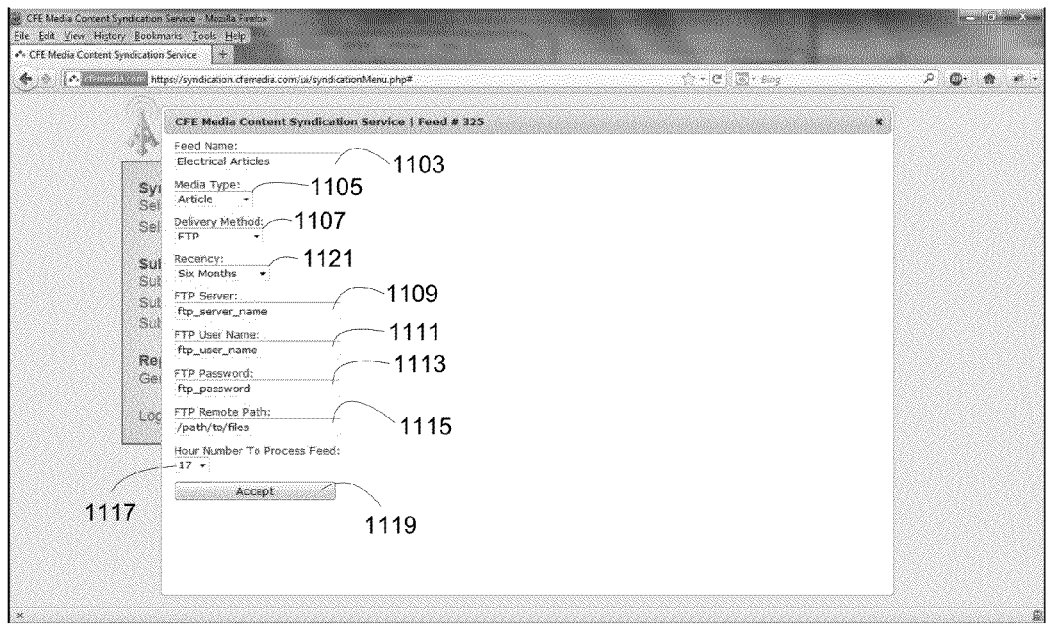

Selecting link 1015 for adding a new feed may present a user with window 1101 illustrated in FIG. 11. Window 1101 includes a feed name field 1103, media type field 1105, delivery method field 1107, recency field 1121, FTP server field 1109, FTP user name field 1111, FTP password field 1113, FTP remote path field 1115, hour number to process feed field 1117, and an accept button 1119. Fields 1109 through 1115 may be displayed only when delivery method 1107 is set to FTP, otherwise, they may be either invisible or grayed out. Window 1101 may also be displayed to a user when clicking on edit links 1005 to modify the settings of an existing feed. Any changes or input recorded are saved by selecting accept link 1119.

Figure 12:
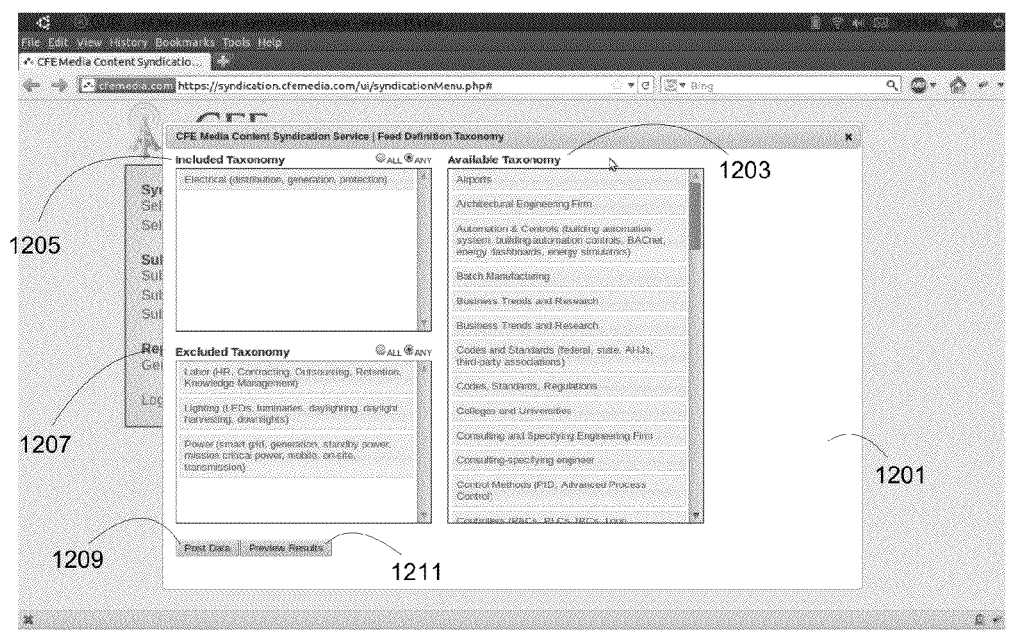

FIG. 12 illustrates a window 1201 for defining the taxonomies for a feed. Window 1201 includes an available taxonomy box 1203, included taxonomy box 1205, excluded taxonomy box 1207, post data button 1209 and a preview results button 1211. Taxonomies available in box 1203 may be selected for inclusion in a feed (box 1205) or exclusion from a feed (box 1207). Box 1205 and 1207 may each include radio buttons indicating whether any or all of the selected taxonomies should be included and excluded from a feed. Selecting post data 1209 sets the taxonomies for the feeds and may bring a user back to a previous menu. Preview results 1211 allows a user to view the results of the feed according to the included and/or excluded taxonomies, which is described in further detail with regard to FIG. 14.

Figure 13:
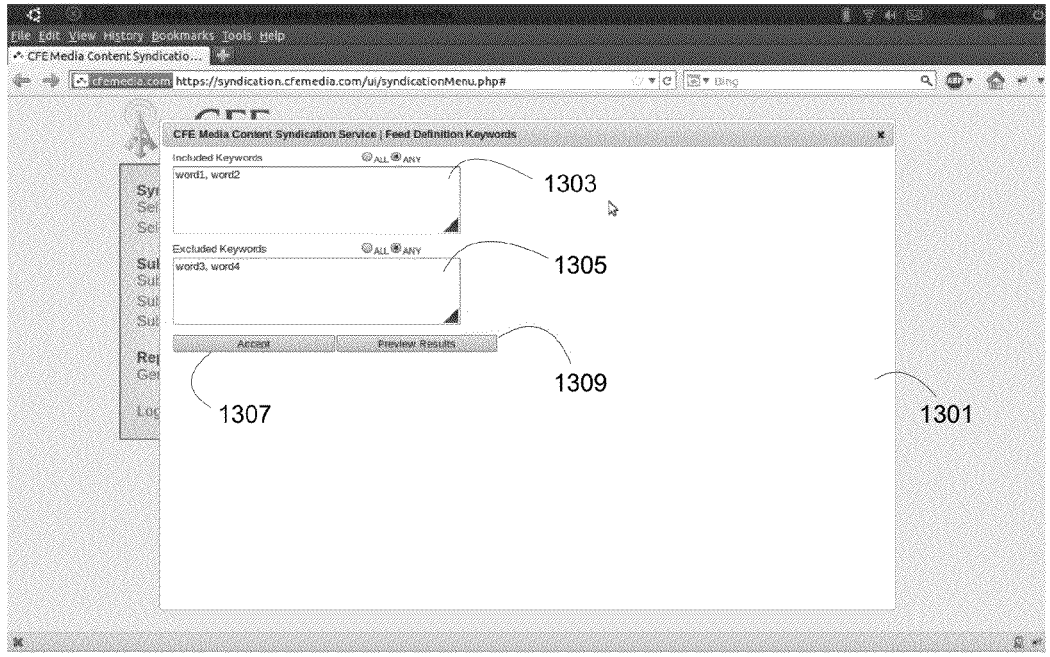

FIG. 13 illustrates a window 1301 for defining the keywords for a feed. Window 1301 includes an included keywords box 1303, excluded keywords box 1305, accept button 1307 and a preview results button 1309. Keywords entered in box 1303 may be provided for inclusion in a feed and keywords in box 1305 may be provided for exclusion from a feed. Box 1303 and 1305 may each include radio buttons indicating whether any or all of the selected keywords should be included and excluded from a feed. Selecting accept 1307 enters the keywords for the feeds and may bring a user back to a previous menu. Preview results button 1309 allows a user to view the results of the feed according to the included and/or excluded keywords.

Figure 14:
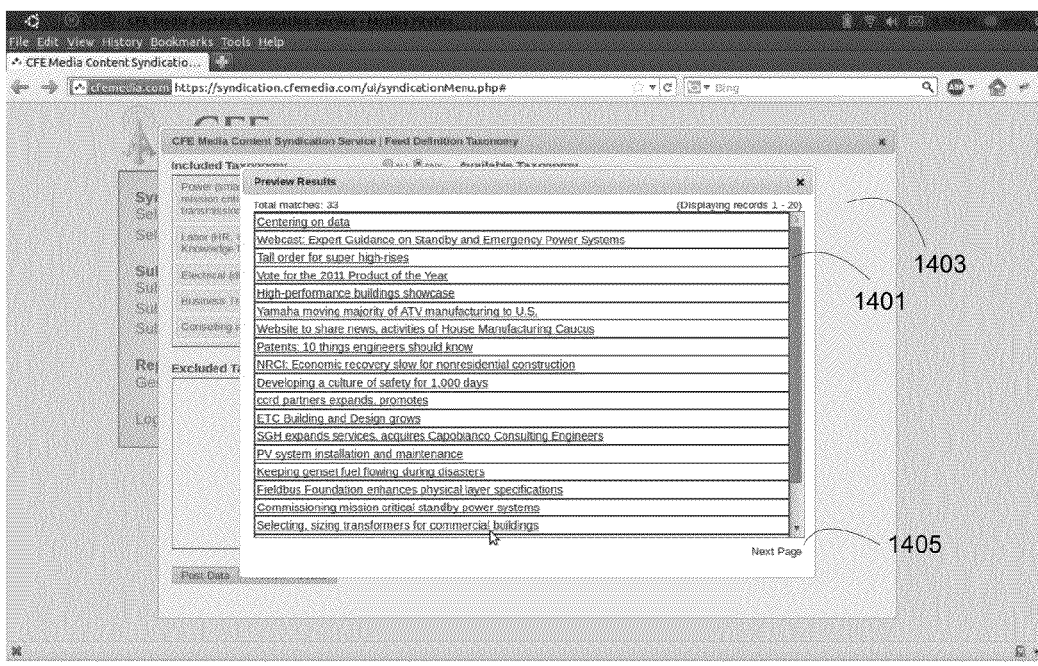

FIG. 14 presents an exemplary preview of a feed definition. The listing of results 1401 may be displayed upon a request to view a preview of a feed from window 1403. Window 1403, as illustrated, shows the taxonomy window as described in FIG. 12. Window 1403 may also be display from the window described in FIG. 13 as a result of requesting a preview of the results of a feed after defining keywords for the feed. Listing 1401 may display all the results in response to the selected taxonomies and keywords for the feed. Next page button 1405 may be selected to navigate to a next page of results.

Figure 15:
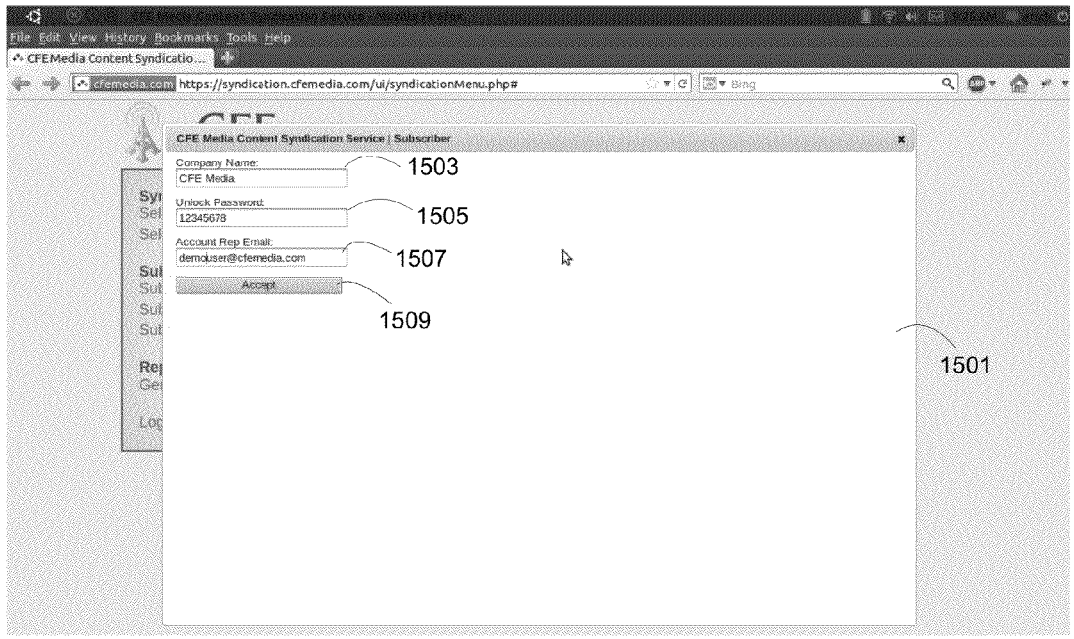

FIG. 15 presents a window 1501 for entering information to create a new subscriber and assign their unlock password. A subscriber may be created by an administrator by filling out a company name field 1503, an unlock password field 1505, an account representative email field 1507 and clicking accept button 1509. A feed may be locked by a subscriber or administrator. Once a feed is locked, changes may no longer be made to a feed unless the unlock password entered in field 1505 is provided.

Figure 16:
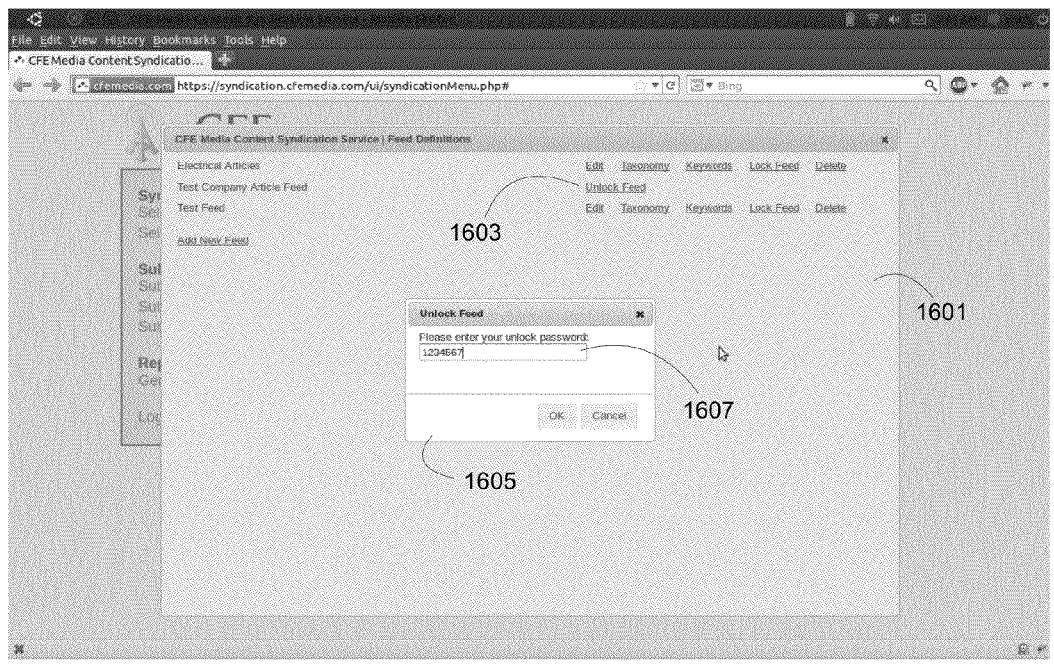

FIG. 16 illustrates a screen including a window 1601 of managing feed definitions. When a feed is locked, an unlock feed link 1603 replaces the normal links that appears with unlocked feeds. Selection of unlock feed link 1603 prompts a user for a password on window 1605. In order to unlock a feed, the unlock password provided when locking the feed should be entered into field 1607 by a user. Upon providing the correct password, the previously locked feed will appear with all the normal actions available (e.g. edit, taxonomy, keywords, lock feed, and delete). In another embodiment, an administrator may override or reset a lock password in the case that the lock password was lost or forgotten.

Figure 17A:
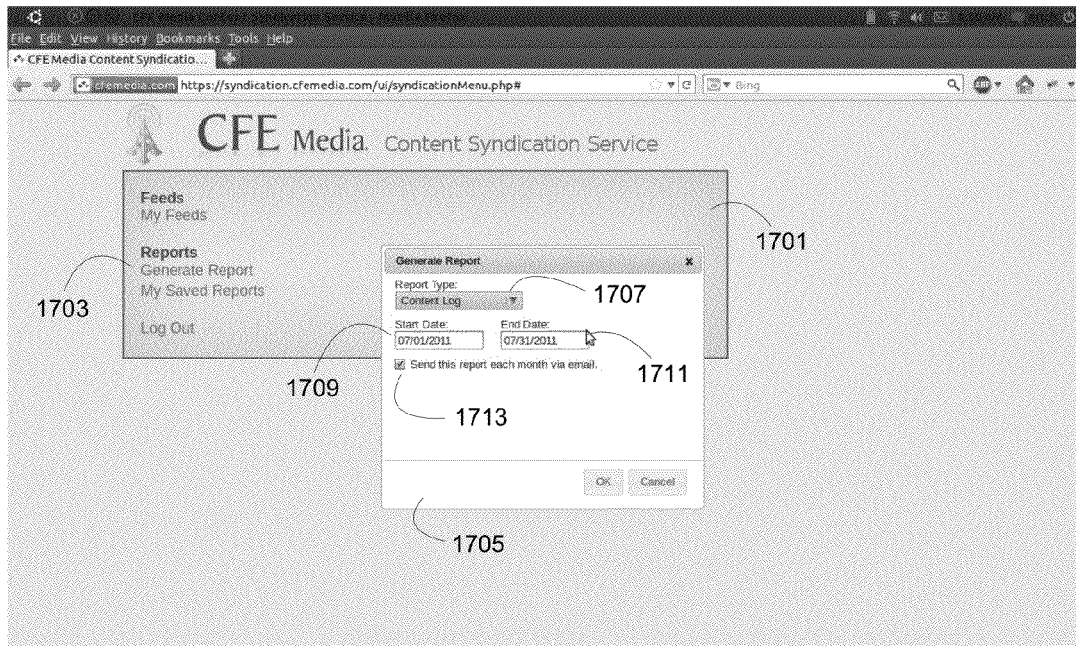

FIG. 17A presents a screen for generating a report by a subscriber level user. Window 1701 includes an option or link 1703 to generate a report. Upon selecting link 1703, a window 1705 is displayed, which includes a report type field 1707, start date field 1709, end date field 171 and a "send this report each month via email" checkbox option 1713. The types of reports generated may include content logs, page view details, and page view summaries. Reports may be generated according to the specified parameters and saved for subsequent viewing or retrieval.

Figure 17B:
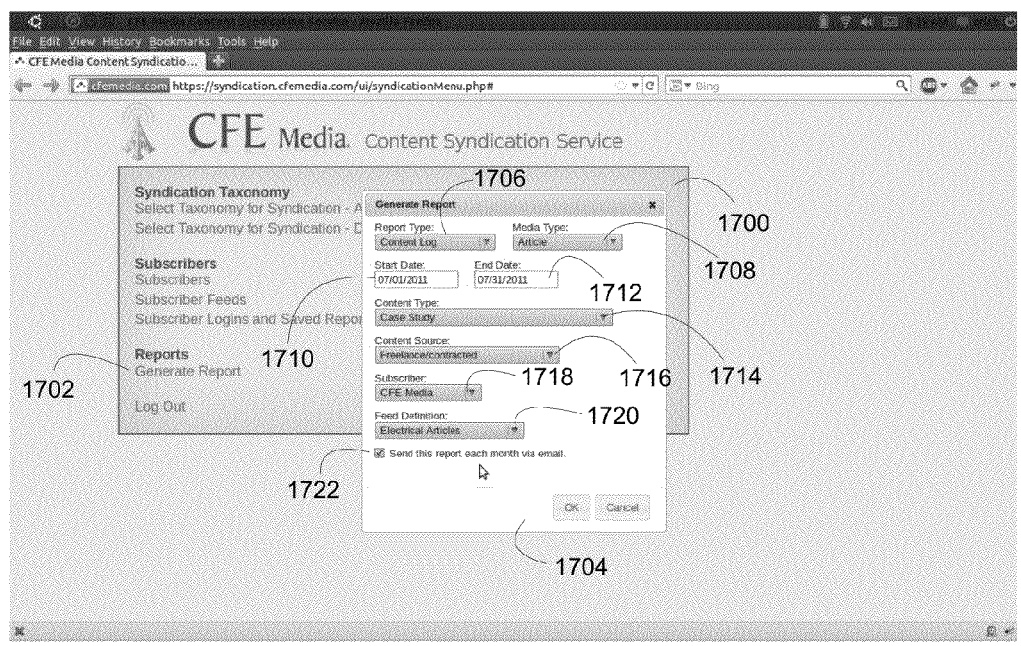

According to another embodiment, FIG. 17B presents a screen for generating a report by an administrator level user. The options available to subscribers may be limited or a subset of options available for generating reports by an administrator. Similar to window 1701, window 1700 includes a generate report link 1702. Selecting link 1702 may cause window 1704 to be displayed to the administrator. Window 1704 includes a report type field 1706, media type field 1708, start date field 1710, end data field 1712, content type field 1714, content source field 1716, subscriber field, 1718, feed definition field 1720, and a "send this report each month via email" checkbox option 1722.

Figure 18:
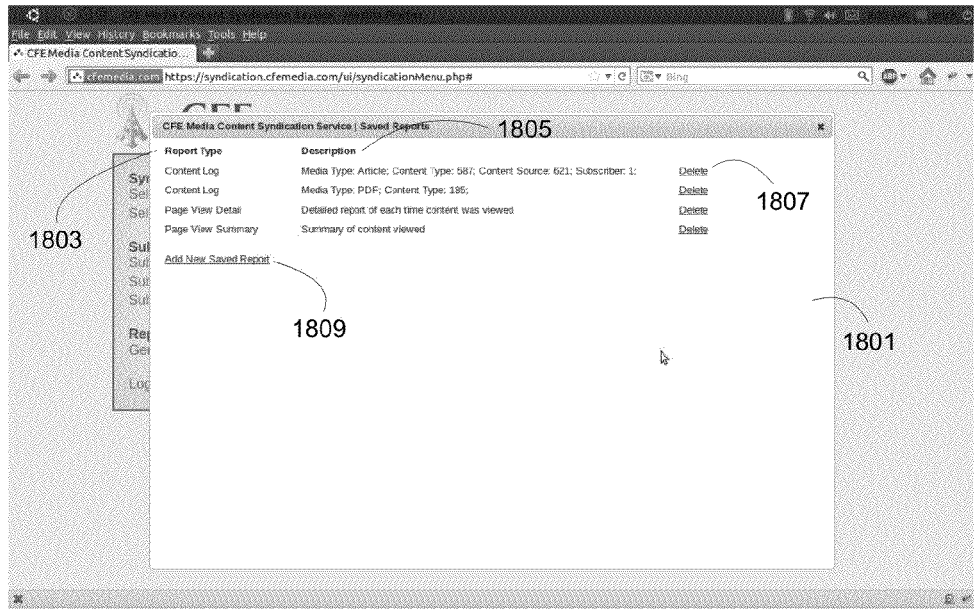

Generated reports may be saved and later accessed by selecting "My Saved Reports" (FIG. 9A, 907 and FIG. 9B, 910). FIG. 18 presents a window 1801 showing a list of saved reports. Window 1801 includes a list of report types 1803, description 1805, delete links 1807 and an Add New Saved Report link 1809. Saved reports may be added or deleted from view in window 1801. Each report may be listed according to their report types and descriptions of the content contained in each of the reports.

Figure 9B:
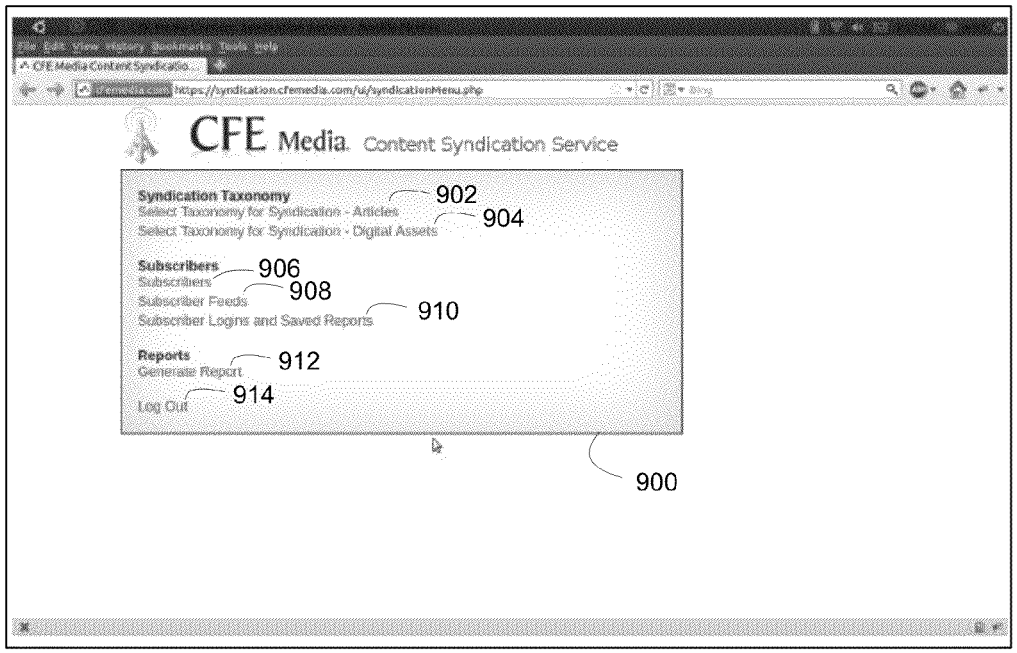
Figure 19:
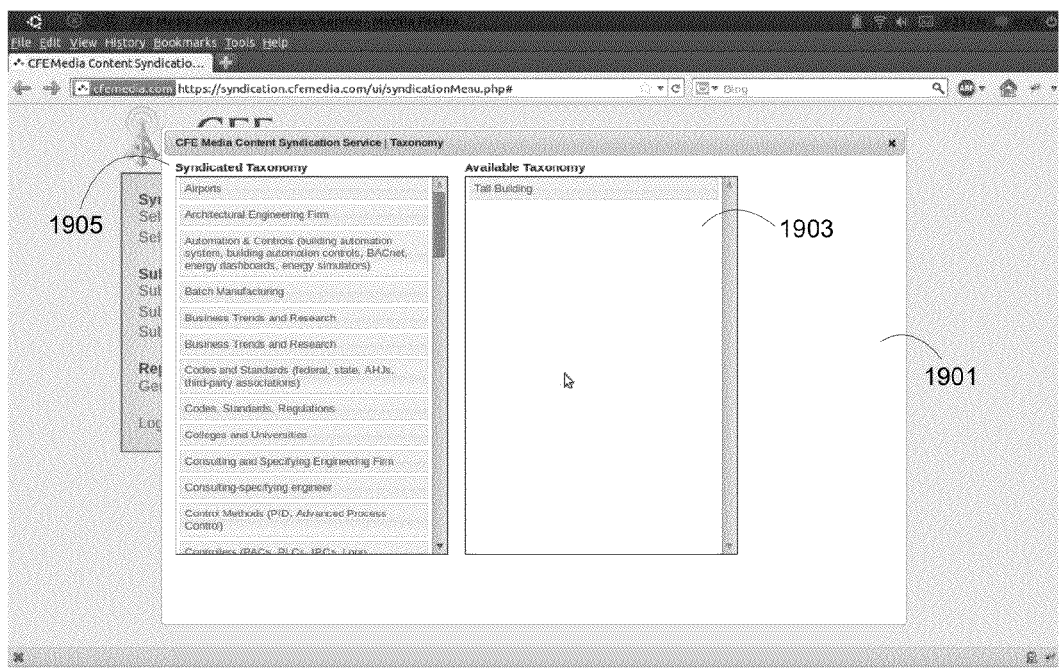

FIG. 19 presents a window 1901 for selecting taxonomy for syndication of articles or digital assets provided by links 902 and 904 in FIG. 9B. According to one embodiment, an administrator may select taxonomies to be available and visible to subscriber users when creating or editing feed definitions. Window 1901 includes an available taxonomy box 103 and a syndicated taxonomy box 1905. Taxonomies in box 1905 may be a list of all the taxonomies created in the system. An administrator may select the taxonomies deemed appropriate to be made for availability to non-administrator users. Taxonomies that are not made available may be discontinued, experimental, or internal taxonomies that should not be used to create feeds.

Figure 20:
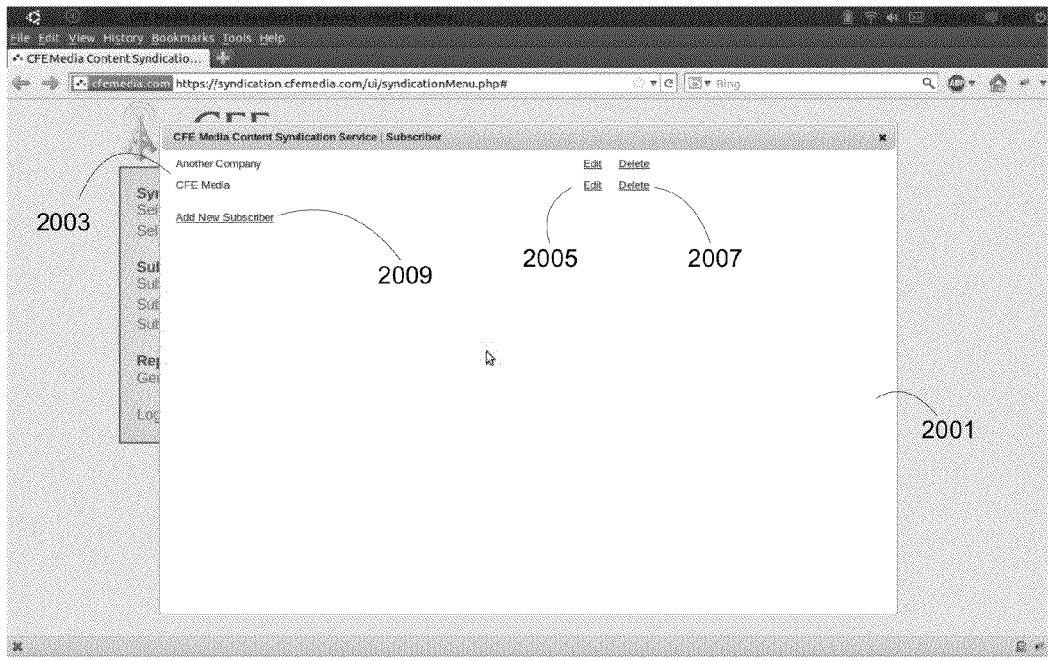

FIG. 20 presents a screen including a window 2001 for adding new subscribers. Adding new subscribers may be an action under the managing of subscribers, as discussed regarding FIG. 9B, made available only to administrators. Window 2001 includes a list of subscribers 2003, edit links 2005, delete links 2007, and a link 2009 to add a new subscriber. Edit links 2005 may allow an administrator to change subscriber information, name or preferences. Delete link 2007 may be used by an administrator to remove a subscriber from the syndication service in the event that the subscriber is no longer a customer or any other reasons. Link 2009 allows an administrator to add new subscribers into the syndication system.

Figure 21:
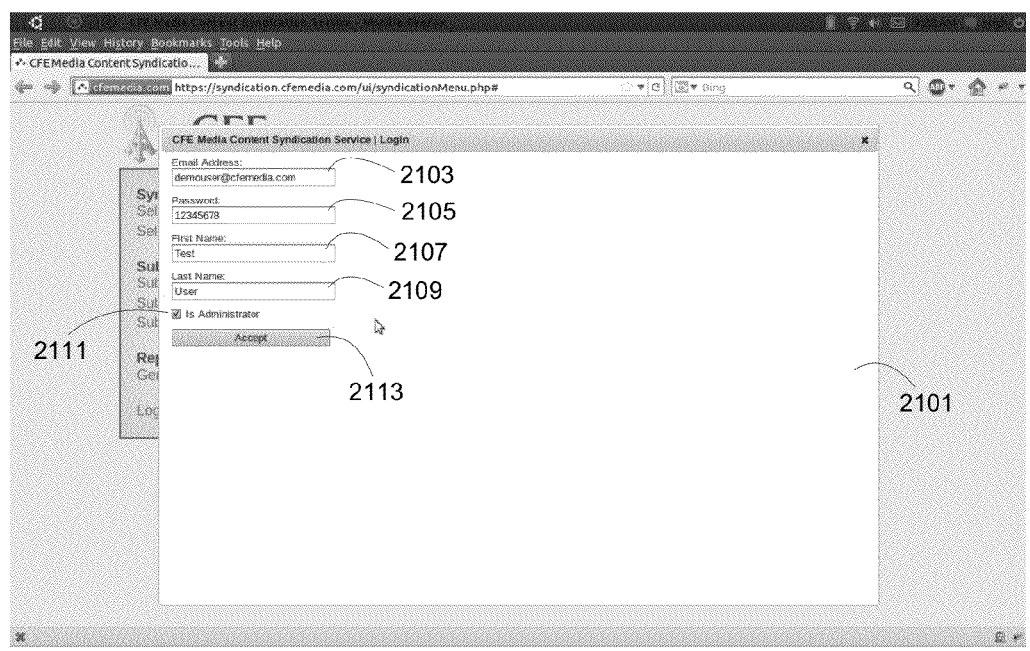

FIG. 21 presents window 2101 for managing subscriber login information provided by link 910 of FIG. 9B. Window 2101 includes an email address field 2103, password field 2105, first name field 2107, last name field 2109, an administrator checkbox option 2111 and an accept button 2113. An administrator may modify or edit any of the fields in window 2101 and decided whether a user should be able to login as an administrator. When changes are finished being made, accept button 2113 may be selected to finalize any changes made by the administrator to the login information of a given user.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for providing content syndication to subscribers, the method comprising:

receiving, by a content distribution server, one or more content items from a plurality of information sources;

indexing, by the content distribution server into a database, each of the one or more content items with an identifier, one or more tags indicating a taxonomy of the one or more content items, one or more keywords associated with the one or more content items, and a media type of the one or more content items from a set of file types supportable for syndication;

automatically processing, by the content distribution server, a subscription feed according to a subscriber-defined timing by queuing identifiers of a selection of the one or more content items from the database including content items indexed with one or more given tags, one or more given keywords, and one or more given media types, wherein the queuing of the identifiers of the selection of the one or more content items includes new content that is identified from the database on the basis of the subscriber-defined timing and placed on a queue when the new content is received from the plurality of information sources and becomes available for retrieval from the database;

retrieving, by the content distribution server, the selection of the one or more content items from the database using the identifiers of the selection of the one or more content items from the queue;

creating, by the content distribution server, data structures from the selection of content items;

repurposing the data structures by configuring the data structures into subscriber-operated website content for consumption by end users; and syndicating, by the content distribution server, the created data structures to the subscriber of the subscription.

2. The method of claim 1 further comprising the content distribution server transmitting the created data structures to one or more subscriber servers associated with the subscription.

3. The method of claim 2 wherein the created data structures are transmitted in a prescribed format.

4. The method of claim 3 wherein the subscription specifies a prescribed format for receiving the created data structures by the one or more subscriber servers.

5. The method of claim 3 wherein the prescribed format is a format suitable for seamless integration with subscriber content of the one or more subscribers.

6. The method of claim 5 wherein content of the created data structures is merged with the subscriber content.

7. The method of claim 6 wherein the subscriber content merged with the content of the created data structures is retrieved from the one or more subscriber servers by one or more end-consumer clients.

8. A method for providing content syndication to subscribers, the method comprising:

receiving, by a content distribution server, a request for subscription to a feed of one or more desired content items from a corpus;

generating, by the content distribution server, a feed definition for the subscription to the one or more desired content items;

receiving, by the content distribution server, a selection of one or more taxonomies for the one or more desired content items;

receiving, by the content distribution server, one or more keywords for the one or more desired content items;

receiving, by the content distribution server, a selection of a media type for the one or more desired content items from a set of file types supportable for syndication;

characterizing, by the content distribution server, the one or more desired content items on the basis of the one or more taxonomies, the one or more keywords, and the media type;

associating, by the content distribution server, the characterization of the one or more desired content items with the feed definition;

storing, by the content distribution server, the feed definition;

processing the feed definition, by the content distribution server, according to a subscriber-defined timing by queuing identifiers of content matching the characterization of the one or more desired content items from the corpus using the feed definition, wherein the queuing of the identifiers of the matching content includes new content that is identified from the corpus on the basis of the subscriber-defined timing and placed on a queue when the new content becomes available for retrieval from the corpus;

retrieving, by the content distribution server, the matching content from the corpus using the identifiers of the matching content from the queue;

creating, by the content distribution server, data structures from the matching content;

repurposing the data structures by configuring the data structures into subscriber-operated website content for consumption by end users; and syndicating, by the content distribution server, the created data structures to the subscriber of the subscription.

9. The method of claim 8 wherein the one or more taxonomies include at least one of a topic, target, type, origin, and purpose.

10. The method of claim 8 wherein the media type is at least one of an article and a digital asset.

11. The method of claim 8 further comprising receiving a recency criterion for the one or more desired content items.

12. The method of claim 8 further comprising the content distribution server transmitting the created data structures to one or more subscriber servers associated with the feed definition.

13. The method of claim 8 wherein the created data structures are suitable for formatting by the one or more subscriber servers.

14. The method of claim 13 wherein the one or more subscriber servers format the created data structures into subscriber content.

15. The method of claim 14 wherein the subscriber content including content from the created data structures are provided to one or more end-consumer clients.

16. A method for providing content syndication to subscribers, the method comprising:

automatically processing, by a content distribution server, a feed definition according to a subscriber-defined timing by identifying one or more content items matching the feed definition, the feed definition specifying a subscription to a feed of one or more desired types of content according to one or more taxonomies, one or more keywords, a media type from a set of file types supportable for syndication, a recency criterion, and a specified delivery method, wherein the identifying of the one or more content items includes new content that is identified from a content database on the basis of the subscriber-defined timing when the new content becomes available for retrieval from the content database;

populating, by the content distribution server, a queue with identifiers of the one or more content items;

retrieving, by the content distribution server, the one or more identified content items from the content database using the identifiers of the one or more content items from the queue;

creating, by the content distribution server, data structures from the one or more identified content items;

repurposing the data structures by configuring the data structures into subscriber-operated website content for consumption by end users; and delivering, by the content distribution server, the created data structures to the one or more subscribers based on the specified delivery method of the feed definition.

17. The method of claim 16 wherein the created data structures are delivered using a SOAP transmission in response to a retrieval request.

18. The method of claim 16 further comprising embedding a tracking object within the created data structures.

19. The method of claim 18, further comprising:
receiving information from the tracking object when content from the created data structures are viewed; and
generating a report with the received information.

20. The method of claim 19 further comprising determining a subscription fee based on the received information.

21. The method of claim 16 further comprising associating subscribers to the feed definition.

22. The method of claim 21 wherein delivering the created data structures comprises delivering the created data structures to a subscriber of the feed definition.

23. The method of claim 16 wherein delivering the created data structures comprises:
generating one or more files including the one or more identified content items on the list; and
delivering the one or more files to a subscriber's server.

24. The method of claim 23 wherein generating one or more files comprises:
determining the media type of the feed definition; and
extracting the one or more identified content items into the one or more files.

25. The method of claim 24 wherein extracting the one or more identified content items comprises extracting one or more links into the one or more files.

26. The method of claim 24 wherein extracting the one or more identified content items comprises extracting one or more images into the one or more files.

27. The method of claim 16, further comprising:
identifying one or more updated content items matching the feed definition; and
populating the queue with a list of the identified one or more updated content items.

28. The method of claim 16 further comprising receiving FTP site credentials.

29. The method of claim 28 wherein delivering the one or more content items comprises:
generating one or more files including the one or more identified content items on the list;
accessing a FTP site using the FTP site credentials; and
delivering the one or more files to the FTP site.

30. The method of claim 16 wherein the created data structures are suitable for formatting into subscriber content.

31. The method of claim 30 wherein the subscriber content is provided to one or more end-consumers.

32. A system for providing content syndication to subscribers, the system comprising:
a content database configured to store one or more tags indicating taxonomy and keywords with a plurality of content items;
a syndication database configured to store a plurality of feed definitions, each feed definition specifying a subscription to a feed of one or more desired types of content according to one or more selected taxonomies, media types from a set of file types supportable for syndication, and keywords;
a processor; and
a memory having executable instructions stored thereon that when executed by the processor cause the processor to:
automatically process the plurality of feed definitions according to one or more subscriber-defined timings by identifying one or more content items from the content database with one or more tags and keywords matching a given one of the plurality of feed definitions, wherein the identifying of the one or more content items includes new content that is identified from the content database on the basis of the one or more subscriber-defined timings when the new content becomes available for retrieval from the content database;
populate a queue with identifiers of the one or more content items;
retrieve the one or more identified content items from the content database using the identifiers of the one or more content items from the queue;
create data structures from the one or more identified content items;
repurpose the data structures by configuring the data structures into subscriber-operated website content for consumption by end users; and
syndicate the created data structures to the subscriber of the subscription.

33. The system of claim 32 wherein the processor is configured to transmit the created data structures to one or more subscriber servers associated with the feed definition.

34. The method of claim 33 wherein the created data structures are transmitted in a prescribed format.

35. The method of claim 34 wherein the prescribed format is a format suitable for seamless integration with subscriber content associated with the one or more subscriber servers.

36. The method of claim 35 wherein content from the created data structures are merged with the subscriber content.

37. The method of claim 36 wherein the subscriber content merged with the content from the created data structures is retrieved from the one or more subscriber servers by one or more end-consumer clients.

38. A method for providing content syndication to subscribers, the method comprising:
receiving, by a content distribution server, a plurality of content items from a plurality of information sources;
indexing, by the content distribution server into a database, each of the plurality of content items with an identifier, tags, keywords, and media types from a set of file types supportable for syndication;
receiving, by the content distribution server, a request for subscription to a feed of a subset of the plurality of content items that match one or more tags, keywords, and media types;
generating, by the content distribution server, a feed definition for a subscription to the subset of content items;
automatically processing, by the content distribution server, the feed definition according to a subscriber-defined timing by queuing identifiers of the subset of content items according to the feed definition, wherein the queuing of the identifiers of the subset of content items includes new content that is identified from the database on the basis of the subscriber-defined timing and placed on a queue when the new content is received from the plurality of information sources and becomes available for retrieval from the database;
retrieving, by the content distribution server, the subset of content items from the database using the identifiers of the subset of content items from the queue;
creating, by the content distribution server, data structures from the subset of content items;
repurposing the data structures by configuring the data structures into subscriber-operated website content for consumption by one or more end-consumers;
transmitting, by the content distribution server, the created data structures to the one or more subscribers associated with the feed definition;
wherein the subset of content items is merged with the subscriber-operated website content for consumption by the one or more end-consumers; and wherein the subset of content items merged with the subscriber-operated website content for consumption by the one or more end-consumers is retrieved from the one or more subscribers by one or more end-consumers.

39. A system for providing content syndication to subscribers, the system comprising:
- at least one content server providing a plurality of content items;
- a content database configured to store the plurality of content items with one or more tags indicating taxonomy and keywords;
- a syndication database configured to store a plurality of feed definitions, each feed definition specifying a subscription to a feed of one or more content items according to one or more selected taxonomies, media types from a set of file types supportable for syndication, and keywords;
- a content distribution server configured to:
  - retrieve the plurality of content items from the at least one content server;
  - store the plurality of content items into the content database;
  - process the plurality of feed definitions according to one or more subscriber-defined timings by queuing identifiers of the one or more content items from the content database with one or more taxonomies and keywords matching a given one of the plurality of feed definitions, wherein the queuing of the identifiers of the selection of the one or more content items includes new content that is identified from the content database on the basis of the one or more subscriber-defined timings and placed on a queue when the new content is provided from the content server and becomes available for retrieval from the content database,
  - retrieve the one or more content items from the content database using the identifiers of the one or more content items from the queue;
  - create data structures from the content items;
  - repurpose the data structures by configuring the data structures into subscriber-operated website content for consumption by one or more end-consumers;
  - transmit the created data structures to at least one subscriber server;
- wherein the at least one subscriber server receives the created data structures; and
- wherein at least one end-consumer client device retrieves the created data structures as the subscriber-operated website content from the at least one subscriber server.

* * * * *